United States Patent
Shimomura

(10) Patent No.: US 7,380,720 B2
(45) Date of Patent: Jun. 3, 2008

(54) OPTICAL SCANNING SYSTEM AND IMAGE FORMING APPARATUS USING THE SAME

(75) Inventor: Hidekazu Shimomura, Yokohama (JP)

(73) Assignee: Canon Kabushiki Kaisha, Tokyo (JP)

( * ) Notice: Subject to any disclaimer, the term of this patent is extended or adjusted under 35 U.S.C. 154(b) by 121 days.

(21) Appl. No.: 11/606,131

(22) Filed: Nov. 30, 2006

(65) Prior Publication Data

US 2007/0119935 A1    May 31, 2007

(30) Foreign Application Priority Data

Nov. 30, 2005    (JP)    .............................. 2005-347153

(51) Int. Cl.
*G06K 7/10* (2006.01)
(52) U.S. Cl. ......................... 235/462.41; 235/462.01; 235/462.25; 235/462.43
(58) Field of Classification Search ................ 235/454, 235/462.25, 462.41, 462.43, 462.45, 472.01, 235/462.01
See application file for complete search history.

(56) References Cited

U.S. PATENT DOCUMENTS

| | | | | |
|---|---|---|---|---|
| 6,046,835 | A | 4/2000 | Yamawaki et al. | ......... 359/205 |
| 6,141,118 | A | 10/2000 | Yamawaki et al. | ......... 358/481 |
| 6,208,450 | B1* | 3/2001 | Toyoda | ........................ 359/205 |
| 6,790,389 | B2 | 9/2004 | Koreeda et al. | ............. 264/2.5 |
| 6,793,137 | B2* | 9/2004 | Kato | ..................... 235/462.25 |
| 7,034,859 | B2 | 4/2006 | Ishihara et al. | ............. 347/244 |
| 7,053,922 | B2 | 5/2006 | Kato et al. | ................... 347/244 |
| 2003/0038228 | A1* | 2/2003 | Fujibayashi et al. | ..... 250/208.1 |
| 2006/0164709 | A1 | 7/2006 | Tomita et al. | .............. 359/205 |

FOREIGN PATENT DOCUMENTS

| | | |
|---|---|---|
| JP | 10-73778 | 3/1998 |
| JP | 10-197821 | 7/1998 |
| JP | 2000-155279 | 6/2000 |
| JP | 2002-160268 | 6/2002 |
| JP | 2004-70109 | 3/2004 |
| JP | 2004-188940 | 7/2004 |
| JP | 2004-294713 | 10/2004 |
| JP | 2004-309559 | 11/2004 |

* cited by examiner

*Primary Examiner*—Seung Ho Lee
*Assistant Examiner*—April Taylor
(74) *Attorney, Agent, or Firm*—Fitzpatrick, Cella, Harper & Scinto

(57) ABSTRACT

An optical scanning system having an imaging optical system for imaging a plurality of light beams deflected by a deflecting surface of a optical deflector upon different scan surfaces. The imaging optical system includes an imaging optical element which has at least one optical surface defined, with respect to the sub-scan sectional plane, in accordance with different functions related to different regions. When with respect to the sub-scan sectional plane the plurality of light beams incident on one and the same deflecting surface of the optical deflector have the same reflection point thereon, there is relationship defined for a meridional line of the optical surface of the imaging optical element defined in accordance with the function, whereas when the plurality of light beams have different reflection points on the optical deflector, there is a different relationship for the meridional line.

13 Claims, 13 Drawing Sheets

OPTICAL SCANNING SYSTEM AND IMAGE FORMING APPARATUS USING THE SAME

FIELD OF THE INVENTION AND RELATED ART

This invention relates to an optical scanning system and an image forming apparatus using the same. The present invention is suitably applicable to an image forming apparatus such as a laser bean printer, a digital copying machine or a multiple-function printer, having an electrophotographic process, for example.

Optical scanning systems are used in a laser beam printer (LBP), a digital copying machine, a multi-function printer and so on. In such optical scanning systems, a light beam is optically modulated and emitted from a light source means in accordance with an imagewise signal, and it is then periodically deflected by means of an optical deflector having a rotary polygonal mirror (polygon mirror), for example. The thus deflected light beam is focused into a light spot upon the surface of a photosensitive recording medium (photosensitive drum) by means of an imaging optical system having an f-θ characteristic, by which the drum surface is optically scanned and image recording is carried out thereby.

FIG. 20 is a schematic view of a main portion of such an optical scanning system.

In FIG. 20, a divergent light beam emitted from a light source means 201 is transformed into a parallel light beam by a collimator lens 203 and, after it is restricted by a stop 202, the light beam enters into a cylindrical lens 204 having a predetermined refractive power only in a sub-scan direction. As far as a main-scan sectional plane is concerned, the parallel light incident on the cylindrical lens 204 exits therefrom while keeping its state. As far as a sub-scan sectional plane concerns, the light beam is converged and imaged as a linear image upon a deflecting surface (reflection surface) 205a of a deflecting means 205 that comprises a polygonal mirror.

The light beam deflected by the deflecting surface 205a of the optical deflector 205 is directed onto a photosensitive drum surface 208 as a scan surface to be scanned, by an imaging optical system 206 having an f-θ characteristic. By rotating the optical deflector 205 in a direction of an arrow A, the photosensitive drum surface 208 is optically scanned in a direction of an arrow B (main-scan direction), whereby imagewise data is recorded thereon.

Various proposals have been made in regard to such optical scanning systems (see Patent Documents Nos. 1, 2 and 3).

Patent Document No. 1 shows an optical scanning system wherein four light beams are incident on a single optical deflector at different angles with respect to the sub-scan direction, and these are directed to different photosensitive drums, respectively.

Patent Document No. 2 shows an optical scanning system wherein a plurality of deflectors are disposed in a pile along in the sub-scan direction. A plurality of light beams are incident on the deflecting surfaces of these deflectors and these are directed to different photosensitive drums, respectively.

Patent Document No. 3 shows an optical scanning system in which two light beams, in each side, are incident on a single optical deflector at different angles with respect to the sub-scan direction, and these light beams pass through different regions of a single imaging lens and are directed to different photosensitive drums, respectively.

[Patent Documents]
1. Japanese Laid-Open Patent Application, Publication No. 2004-309559
2. Japanese Laid-Open Patent Application, Publication No. 2004-188940
3. Japanese Laid-Open Patent Application, Publication No. 2004-70109

SUMMARY OF THE INVENTION

The optical scanning system disclosed in Patent Document No. 1 uses a long lens having the same surface shape. One surface of the imaging lens system is divided into an inner region and an outer region, and the surfaces of these regions are formed with different shapes defined by a two-dimensional polynomial aspherical surface or an anamorphic aspherical surface.

Generally, if a light beam is incident on the deflecting surface of an optical deflector in an oblique direction thereto with respect to the sub-scan sectional plane, due to distortion (twist) of the wavefront aberration, rotation of light spot occurs on the scan surface to be scanned.

In Patent Document No. 1, the amount of shift and the amount of tilt of the long lens with respect to the sub-scan direction are made different, between the light beam that passes through the inner region of one surface of the imaging lens system and the light beam that passes through the outer region thereof, by which distortion of the wavefront is reduced. Although the imaging lens system of this structure is applicable to all the scanning light beams, use of four long lenses is necessary to the scanning light beams, respectively, such that the system as a whole becomes very complicated. Furthermore, in one surface of the imaging lens system divided into inner and outer regions, there are two-dimensional polynomial aspherical surfaces or anamorphic surfaces which are adjoining discontinuously as shown in FIG. 21. Therefore, if the lens is to be produced by injection molding such as in the case of plastic lens, sink or shrink may occur at the discontinuous points.

On the other hand, in the optical scanning system disclosed in Patent Document No. 2, as shown in FIG. 22, plural optical deflectors 225 and 225b are disposed in a pile with respect to the sub-scan direction, and plural light beams are incident on the deflecting surfaces of the optical deflectors 225a and 225b, respectively, by which the light path is divided. In such structure, there is no necessity of oblique incidence of light with respect to the sub-scan sectional plane and, thus, distortion of wavefront aberration does not occur.

However, in Patent Document No. 2, use of plural deflectors is indispensable, and this makes the system structure very complicated. Furthermore, with regard to the driving means for rotating the optical deflectors 225a and 225b, use of a powerful motor will be necessary.

In the optical scanning system disclosed in Patent Document No. 3, a plurality of light beams are incident on the deflecting surface of an optical deflector in an oblique direction and at different angles with respect to the sub-scan sectional plane. The light beams deflected thereby passé through a single imaging lens and are directed to different photosensitive drums.

The imaging lens disclosed in Patent Document No. 3 has a large lens thickness as of 17.9 mm, and the lens height is large to allow passage of plural light beams. Hence, if it is made of an optical material such as plastic material, the growth tact will be prolonged. Furthermore, since the plural light beams pass through different regions of the surface which is defined by the same function, as far as an optical system of the type that light is incident obliquely with respect to the sub-scan sectional plane is concerned, correction of light spot rotation is difficult to do.

It is accordingly an object of the present invention to provide a unique and improved optical scanning system and an image forming apparatus having the same.

It is another object of the present invention to provide an optical scanning system and an image forming apparatus having the same by which, when a scan surface is scanned by use of a plurality of light beams, distortion of wavefront aberration in each light beam can be reduced through a common imaging lens, such that the scan surface can be optically scanned with good spots.

In accordance with an aspect of the present invention, to achieve these objects, there is provided an optical scanning system, comprising: light source means having a plurality of light emitting portions; an optical deflector; an input optical system for directing a plurality of light beams from said plurality of light emitting portions onto one and the same deflecting surface of said optical deflector, at different angles relative to a normal to the deflecting surface and with respect to a sub-scan sectional plane; and an imaging optical system for imaging the plurality of light beams deflected by said deflecting surface of said optical deflector upon different scan surfaces, to be scanned, respectively; wherein said imaging optical system includes an imaging optical element, and the plurality of light beams deflected by said deflecting surface of said optical deflector are incident on said imaging optical element so that the plurality of light beams pass through different regions of said imaging optical element with respect to the sub-scan sectional plane, respectively, wherein said imaging optical element has at least one optical surface defined, with respect to the sub-scan sectional plane, in accordance with different functions related to the different regions, respectively, wherein, when with respect to the sub-scan sectional plane the plurality of light beams incident on one and the same deflecting surface of said optical deflector have the same reflection point thereon, a meridional line of the optical surface of said imaging optical element defined in accordance with the function extends through the reflection point, with respect to the sub-scan sectional plane, and also it shifts toward the same side, with respect to an optical reference axis perpendicular to the deflecting surface, where the light beam passes, and wherein, when with respect to the sub-scan sectional plane the plurality of light beams incident on one and the same deflecting surface of said optical deflector have different reflection points on said deflecting surface, a meridional line of the optical surface of said imaging optical element defined on the basis of that function extends, with respect to the sub-scan sectional plane, through a middle point between two reflection points of all the different reflection points which two points are most separate from each other, and also it shifts toward the same side, with respect to the optical reference axis perpendicular to the deflecting surface, where the light beam passes.

In one preferred form of this aspect of the present invention, the following condition is satisfied, where βs is an imaging magnification of said imaging optical system with respect to the sub-scan sectional plane:

$$1.0 < |\beta s| < 3.5$$

Meridional lines defined by different functions in relation to the different regions, with respect to the sub-scan sectional plane, may be curved toward the sub-scan direction.

The imaging optical system may be constituted by a single imaging optical element.

The imaging optical element having an optical surface with a shape defined in accordance with different functions related to the different regions with respect to the sub-scan sectional plane, may have a first optical surface having a shape defined by different functions in relation to the different regions, respectively, with respect to the sub-scan sectional plane, and a second optical surface of flat shape with respect to the sub-scan sectional plane.

The imaging optical system may include a plurality of imaging optical elements, wherein at least one of said plurality of optical elements has an optical surface of a shape defined by different functions in relation to the different regions, respectively, with respect to the sub-scan sectional plane and is disposed at a position closest to the scan surface.

Optical surfaces of a shape defined by different functions in relation to the different regions, respectively, with respect to the sub-scan sectional plane, may be joined each other at a boundary area having a continuous first-order differentiation value.

In the boundary area the optical surfaces may be joined in accordance with a spline function.

A surface vertex of a sagittal line of optical surfaces defined by different functions in relation to different regions with respect to the sub-scan sectional plane, respectively, may be connected along a straight line.

In accordance with another aspect of the present invention, there is provided an image forming apparatus, comprising: an optical scanning system as recited above; a photosensitive material disposed at a scan surface to be scanned; a developing device for developing an electrostatic latent image formed on said photosensitive material through a light beam scanned by said optical scanning system, to produce a toner image; a transferring device for transferring the developed toner image onto a transfer material; and a fixing device for fixing the transferred toner image, on the transfer material.

In accordance with a further aspect of the present invention, there is provided an image forming apparatus, comprising: an optical scanning system as recited in above; and a printer controller for converting code data supplied from an outside machine into an imagewise signal and for inputting the imagewise signal into said optical scanning system.

In accordance with a still further aspect of the present invention, there is provided a color image forming apparatus, comprising: an optical scanning system as recited in above; and a plurality of image bearing members each being disposed at a scan surface to be scanned by said optical scanning system, for forming images of different colors.

In one preferred form of this aspect of the present invention, the apparatus further comprises a printer controller for converting a color signal supplied from an outside machine into imagewise data of different colors and for inputting the imagewise data into corresponding optical scanning systems.

Briefly, in accordance with the present invention, distortion of wavefront aberration to be produced when a plurality of light beams are incident on an optical deflector obliquely and at different angle, with respect to the sub-scan sectional plane, can be reduced, such that optical scanning with good spots is assured.

These and other objects, features and advantages of the present invention will become more apparent upon a consideration of the following description of the preferred embodiments of the present invention taken in conjunction with the accompanying drawings.

DESCRIPTION OF THE PREFERRED EMBODIMENTS

Preferred embodiments of the present invention will now be described with reference to the attached drawings.

First, in the present invention, the term "optical reference axis" (CO) can be defined as follows.

If with respect to the sub-scan sectional plane a plurality of light beams incident on one and the same deflecting surface of an optical deflector have the same reflection point thereon, the optical reference axis CO is defined as an axis that extends, in the sub-scan sectional plane, through the reflection point of the light beams on the deflecting surface and that is perpendicular to the deflecting surface.

On the other hand, if with respect to the sub-scan sectional plane a plurality of light beams incident on one and the same deflecting surface of an optical deflector have different reflection points thereon, the optical reference axis CO is defined as an axis that extends, in the sub-scan sectional plane, through a middle point of two reflection points, among all the reflection points of the light beams incident on the deflecting surface, which two are most spaced from each other, and that is perpendicular to the deflecting surface.

In Embodiments 1-3 to be described below, the number of light beams incident on one and the same deflecting surface of an optical deflector is two. It should be noted however that the present invention is not limited to it. Light beams of a number of three or more may be incident on one and the same deflecting surface of an optical deflector.

If for example four light beams a, b, c and d are incident on one and the same deflecting surface of an optical deflector in the named order with respect to the sub-scan direction, and where the reflection points of these light beams on the deflecting surface are different from each other, the optical reference axis CO of the present invention may be defined as an axis (i) that extends, in the sub-scan sectional plane, through a middle point of a straight line connecting two reflection points a and d (reflection point a for the light beam a, and reflection point d for the light beam d) among the four reflection points at different positions, which two points are most spaced from each other, and (ii) that is perpendicular to the deflecting surface.

Embodiment

Figure 1:
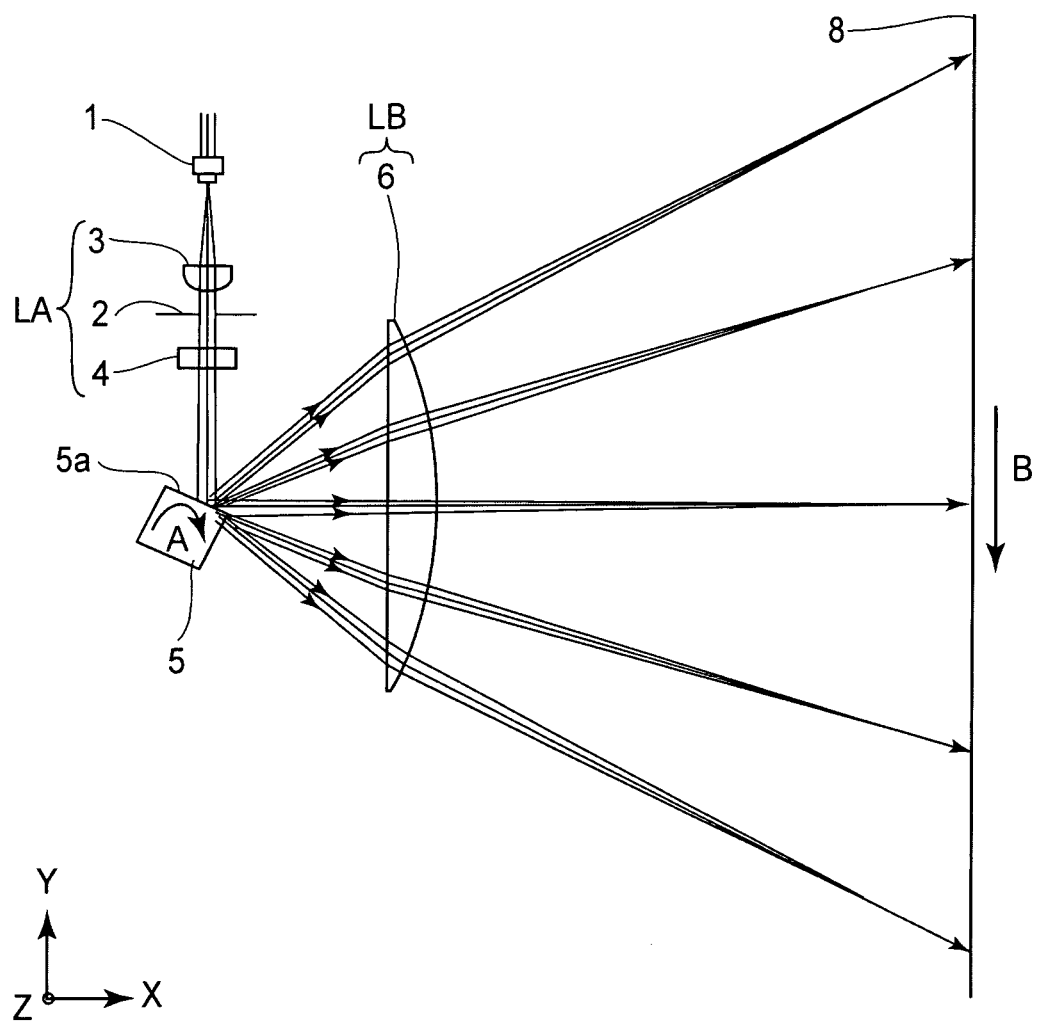
FIG. 1 is a sectional view, along a main-scan sectional plane, of an optical scanning system according to a first embodiment of the present invention.
Figure 2:
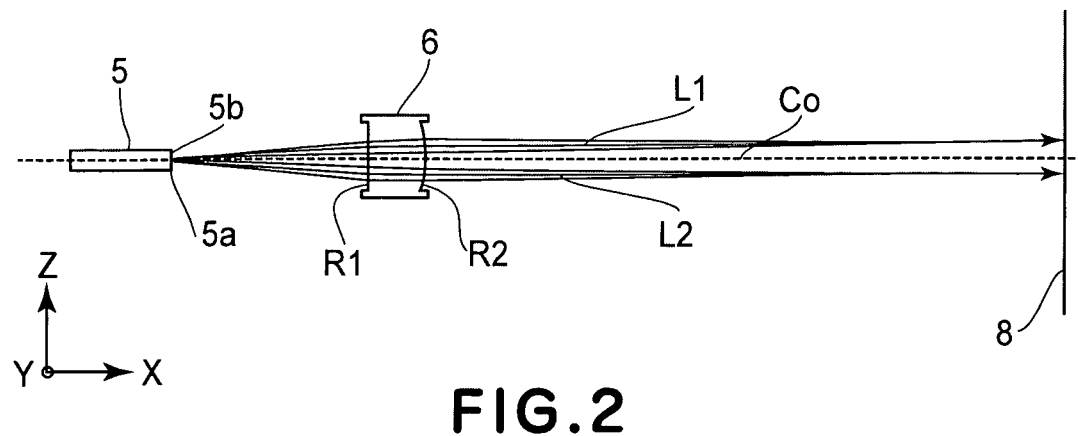
FIG. 2 is a sectional view, along a sub-scan sectional plane, of the optical scanning system according to the first embodiment of the present invention.

FIG. 1 is a sectional view along a main-scan direction (main-scan sectional plane) of a main portion of an optical scanning system according to a first embodiment of the present invention. FIG. 2 is a schematic view along a sub-scan direction (sub-scan sectional plane) of the main portion of the optical scanning system according to the first embodiment of the present invention.

In this specification, the term "main-scan direction" refers to a direction which is perpendicular to the rotational axis of a rotary polygonal mirror and to the optical axis of an imaging optical system (that is, a direction in which a light beam is reflectively deflected (deflectively scanned) by the rotary polygonal mirror). The term "sub-scan direction" refers to a direction which is parallel to the rotational axis of the rotary polygonal mirror. The term "main-scan sectional plane" refers to a plane that is parallel to the main-scan direction and that contains the optical reference axis C to be described later. The term "sub-scan sectional plane" refers to a plane which is perpendicular to the main-scan sectional plane.

In FIGS. 1 and 2, denoted at 1 is light source means (semiconductor laser) having a single light emitting portion (light emission point), which comprises an infrared light source for emitting a light beam of a wavelength λ=790 nm. Although in this embodiment the light source means 1 comprises a single light emitting portion, it may have a plurality of light emitting portions.

Denoted at 3 is a condensing lens (collimator lens) as a collecting optical system, and it functions to transform a divergent light beam emitted from the light source means 1 into a slightly convergent light beam. Denoted at 2 is an aperture stop having a function for restricting the light beam passing therethrough to thereby shape the beam configuration.

Denoted at 4 is a lens system (cylindrical lens) having a predetermined power only in the sub-scan sectional plane (sub-scan direction). It functions to focus the light beam, passing through the condensing lens 3, with respect to the sub-scan sectional plane and upon a reflection surface (deflecting surface) 5*a* of an optical deflector 5, to be described later, as a linear image.

The function of the condensing lens 3 and the cylindrical lens 4 described above may be provided by one and the same optical element. The above-described elements such as condensing lens 3, aperture stop 3 and cylindrical lens 4 are components of an input optical system LA.

Denoted at 5 is an optical deflector as optical deflecting means. It may comprise a polygonal mirror (rotary polygon) having four deflecting surfaces, for example. The polygonal mirror 5 can be rotated by driving means such as a motor (not shown) in a direction of an arrow A in the drawing and at a predetermined speed.

The input optical system (first optical system) LA functions to direct, with respect to the sub-scan sectional plane, a plurality of light beams emitted from the plural light emitting portions of the light source means 1 toward one and the same deflecting surface of the optical deflector 5 at different angles relative to the normal to that deflecting surface.

Denoted at LB is an imaging optical system (second optical system) having a light collecting function and f-θ characteristic. It consists of a single imaging lens (f-θ lens) 6 made of a plastic material.

The imaging optical system LB functions to image the light beam, reflectively deflected by the optical deflector 5 and based on imagewise information, upon the surface of a photosensitive drum (scan surface to be scanned) 8, and also to provide an optically conjugate relationship between the deflecting surface 5*a* of the optical deflector 5 and the photosensitive drum surface 8, with respect to the sub-scan sectional plane, to thereby compensate any surface tilt of the deflecting surface.

In this embodiment, there are two sets of optical systems each comprising a light source means 1, a condensing lens 3 and a cylindrical lens 4, the these two sets of optical systems are disposed in a pile (array) along the sub-scan direction. With this arrangement, two light beams can be incident on the deflecting surface 5*a* of the optical deflector at different angles. These two sets of optical systems are superposed in the main-scan sectional plane and, hence, only one set is illustrated in FIG. 1.

In this embodiment, two light beams deflected by the optical deflector 5 passes through different regions of the imaging lens 6 with respect to the sub-scan sectional plane. The imaging lens 6 has at least one optical surface having a shape which is defined, with respect to the sub-scan sectional plane, in accordance with different functions related to these different regions, respectively.

In this specification, the wording "different functions" means that the definition equation is the same but the coefficient or coefficients have different values, or that the coefficient or coefficients have the same absolute values but the sign is different.

In the present invention, however, the definition equation itself may be different. For example, the lens surface shape in connection with the light beam L1 shown in FIG. 2 may be defined by a function up to tenth order, while the lens surface shape in connection with the light beam L2 may be expressed by using higher-order function, larger than the tenth.

In this embodiment, an optical surface having a shape which is defined in accordance with different functions having the same definition equation but having different coefficients is provided at the light exit side.

Furthermore, a meridional line as defined by the function extends through a reflection point 5*b*, upon the deflection surface 5*a*, of the two light beams incident on the optical deflector 5, and also it shifts toward the same side with respect to the optical reference axis where the light beams are passing.

In this embodiment, the meridional line of each of the different regions is shifted toward the sub-scan direction, as described above, by which distortion or twist of the wavefront aberration (spot rotation) to be produced by oblique incidence of the two light beams upon the deflecting surface 5*a* of the optical deflector 5 is reduced.

Denoted at 8 is the photosensitive drum surface as the scan surface to be scanned.

In this embodiment, a divergent light beam from the semiconductor laser 1 is transformed into a slightly convergent light beam by means of the condensing lens 3, and then, by means of the aperture stop 2, the light beam (light quantity thereof) is restricted. The light beam then enters the cylindrical lens 4.

With regard to the slightly convergent light beam provided by the condensing lens 3, if there is no cylindrical lens 4 and an imaging lens 5, it will be focused at a position of 369.5 mm which is from the deflecting point of the optical deflector 5 toward the scan surface 8.

As far as the main-scan sectional plane is concerned, the slightly convergent light beam incident on the cylindrical lens 4 exits therefrom while keeping its state unchanged. As far as the sub-scan sectional plane concerns, the light beam is further converged, and it is focused upon one and the same deflecting surface 5*a* of the optical deflector 5 as a linear image (linear image extending in the main-scan direction).

Here, the two light beams incident on the deflecting surface 5*a* are incident thereupon at mutually different angles (oblique incidence angles α=±3 deg.) with respect to the sub-scan sectional plane and relative to a plane perpendicular to the rotational axis of the optical deflector 5 (i.e., rotary plane of the optical deflector 5).

The two light beams reflectively deflected by the deflecting surface 5*a* of the optical deflector 5 pass through different regions of the imaging lens 6, respectively, and subsequently they are imaged into light spots upon the photosensitive drum surface 8. Thus, by rotating the optical deflector 5 in the direction of an arrow A, the photosensitive drum surface 8 is optically scanned in the direction of an arrow B (main-scan direction) at a constant speed, whereby an image is recorded on the photosensitive drum (recording medium).

Table 1 below shows the optical arrangement of the optical elements as well as the surface configuration of the optical elements in Numerical Example 1 according to the first embodiment of the present invention.

TABLE 1

DESIGN DATA

WAVELENGTH & REFRACTIVE INDEX

| | | |
|---|---|---|
| Used Wavelength | λ (nm) | 790 |
| Refractive Index | | 1.50000 |
| Disposition | | |
| Main-Scan Laser Incidence Angle (deg) | | 90 |
| Sub-Scan Laser Incidence Angle (deg) | | 3 |
| Largest Light-Ray Emission Angle (deg) | | +/−40.1 |
| Polygon Center Coordinates | Main Scan | −5.412 |
| (mm) | Sub Scan | −4.588 |
| No. of Polygonal Surfaces | | 4 |
| Polygon Circumscribing Circle Diameter (mm) | | φ 20 |
| Distance from Deflection Reference Point to Toric Lens 6 | | 41.85 |
| Toric Lens 6 Center Thickness | | 10.95 |
| Distance from Toric Lens 6 to Scan Surface | | 121.93279 |
| Distance from Deflection Reference Point to Scan Surface | | 174.73279 |
| Effective Scan Width | | 210 |

| | 1st Surface | 2nd Surface |
|---|---|---|
| ASPHERICAL SURFACE DATA | | |
| R | 1.94505E+03 | −1.03609E+02 |
| K | −9.11479E+02 | 1.43606E+00 |
| B4 | −3.81075E−07 | 9.75470E−09 |
| B6 | 6.27828E−11 | −3.83718E−11 |
| B8 | −2.01367E−14 | 8.47040E−15 |
| B10 | 2.07344E−18 | −4.69783E−18 |
| r0 | infinite | −1.76683E+01 |
| D2s | 0 | 1.21952E−04 |
| D4s | 0 | 1.60930E−08 |
| D6s | 0 | −3.41553E−11 |
| D8s | 0 | 1.95785E−14 |
| D10s | 0 | −3.81040E−18 |
| D2e | 0 | 1.47384E−04 |
| D4e | 0 | −9.50268E−09 |
| D6e | 0 | −2.18375E−11 |
| D8e | 0 | 2.38636E−14 |
| D10e | 0 | −7.21834E−18 |
| MERIDIONAL-LINE FUNCTION | | |
| A0 | 0 | 9.35949E−01 |
| A2 | 0 | 0 |
| A4 | 0 | 0 |
| A6 | 0 | 0 |
| A8 | 0 | 0 |
| A10 | 0 | 0 |

Subscript "s": laser-side
Subscript "e": counter laser-side

The meridional-line shape of the light entrance surface and the light exit surface of the imaging lens 6 is determined on the basis of an aspherical surface that can be expressed by a function up to tenth order. If the point of intersection between the imaging lens 6 and the optical axis is taken as an origin, the optical axis direction is taken as an X axis, an axis orthogonal to the optical axis within the main-scan sectional plane is taken as a Y axis, then the meridional-line direction corresponding to the main-scan direction can be expressed by the following.

$$X = \frac{\frac{Y^2}{R}}{1 + \sqrt{1 - (1+k)\left(\frac{Y}{R}\right)^2}} + B4 \times Y^4 + B6 \times Y^6 + B8 \times Y^8 + B10 \times Y^{10} \tag{a}$$

Here, R is the curvature radius of the meridional line, K, B4, B6, B8 and B10 are coefficients.

In this embodiment, as described above, the meridional line connecting the sagittal vertices is being shifted toward the sub-scan direction, in accordance with the function given below. Here, the origin for Z is taken on the optical reference axis CO.

$$Z = \sum_{i=0}^{n} A_i Y^i$$

Furthermore, the sagittal-line direction corresponding to the sub-scan direction can be expressed by the following equation.

$$S = \frac{\frac{Z^2}{Rs^*}}{1 + \sqrt{1 - \left(\frac{Z}{Rs^*}\right)^2}} \tag{b}$$

Here, S denotes the sagittal-line shape as defined within a plane which contains a normal to the meridional line at different positions along the meridional-line direction and which is perpendicular to the main-scan plane.

Here, the curvature radius (sagittal-line curvature radius) Rs* with respect to the sub-scan direction, at a position remote from the optical axis by Y in the main-scan direction, is given by the following equation.

$$Rs^* = Rs \times (1 + D2 \times Y^2 + D4 \times Y^4 + D6 \times Y^6 + D8 \times Y^8 + D10 \times Y^{10})$$

Here, Rs is the sagittal-line curvature radius on the optical axis, and D2, D4, D6, D8 and D10 are sagittal-line change coefficients.

It should be noted here that, although in this embodiment the surface shape of the imaging lens 6 is defined in accordance with the equations mentioned above, the present invention is not limited to this.

In this embodiment, as described above, an infrared light source that provides a light beam of a wavelength λ=790 nm is used as the light source means, and curvature field both in the main-scan direction and the sub-scan direction is well corrected throughout the effective scan region.

In this embodiment, two light beams L1 and L2 (i.e., two light beams incident on the deflecting surface 5a) to be deflected by the deflecting surface 5a with respect to the sub-scan sectional plane of FIG. 2 are deflected thereby in upward and downward directions as viewed in the drawing, at angles of ±3 deg. with respect to the optical reference axis CO. Subsequently, these light beams enter into the imaging lens 6, common to them, and they are directed to the photosensitive drum 8 surface.

Here, the optical reference axis CO corresponds to an axis which extends through the reflection point 5b (actually, in this embodiment, two reflection points are superposed) on one and the same deflecting surface 5a of the two light beams L1 and L2 incident thereupon and also which is perpendicular to that deflecting surface 5a.

However, if the reflection points of the two light beams L1 and L2 incident on the optical deflector 5 are at different positions with respect to the sub-scan sectional plane, then the optical reference axis CO corresponds to an axis which extends through a middle point of a straight line connecting two reflection points at different positions with respect to the sub-scan sectional plane and also which is perpendicular to the deflecting surface.

The numerical example 1 shown in Table 1 concerns the surface shape through which the upper light beam L1, with respect to the optical reference axis CO and as viewed in FIG. 2, passes. The surface shape through which the lower light beam L2 with respect to the optical reference axis CO and as viewed in FIG. 2, and the surface shape through which the upper light beam L1 with respect to the optical reference axis CO are symmetrical with each other. Namely, in these regions, the meridional lines are shifting by opposite amounts with respect to the optical reference axis CO.

Specifically, in Table 1, the sign of the coefficients $A_0$-$Al_0$ is positive for those above the optical reference axis CO, and it is negative for those below the optical reference axis CO.

Figure 3:
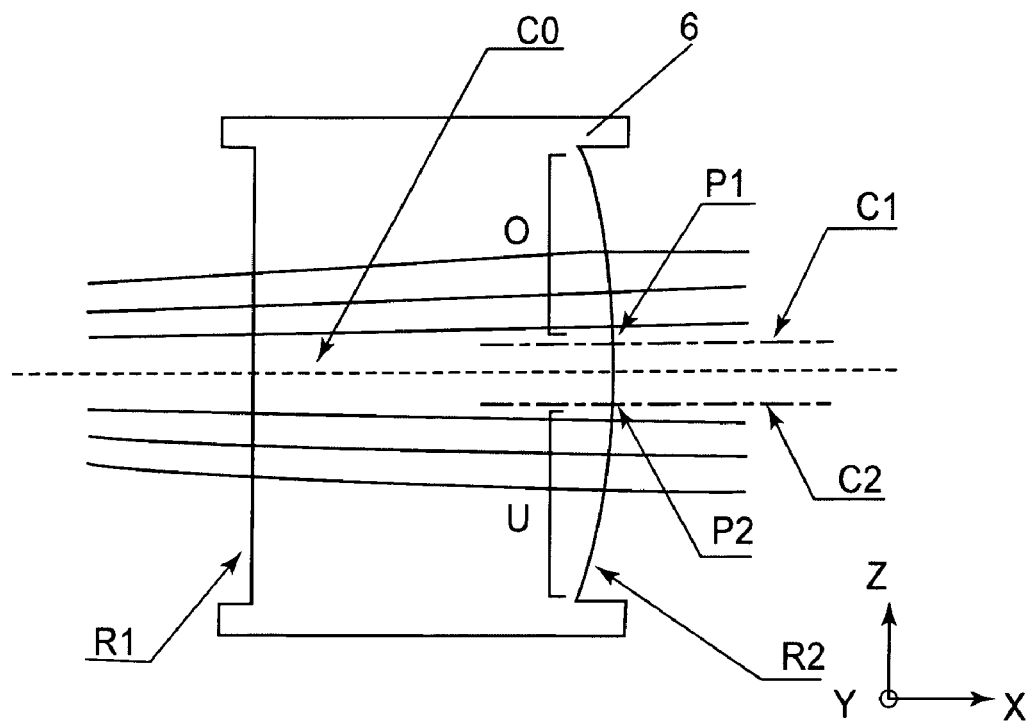
FIG. 3 is a sectional view, along the sub-scan sectional plane, of an imaging lens according to the first embodiment of the present invention.

FIG. 3 is an enlarged view, along the sub-scan sectional plane, of the imaging lens 6 according to this embodiment of the present invention.

Denoted in FIG. 3 at R1 is a light entrance surface which comprises a flat surface without a power, with respect to the sub-scan sectional plane. Denoted at R2 is a light exit surface which is divided into an upper region O and a lower region U with respect to the optical reference axis CO, as viewed in the drawing. In these divided regions, the light exit surface has surface shapes determined in accordance with different functions, respectively, as described hereinbefore.

Further, the meridional lines of these regions defined by these functions are shifting so as to reduce the distortion of the wavefront aberration to be produced by oblique incidence of two light beams upon the deflecting surface 5a of the optical deflector 5, with respect to the sub-scan sectional plane.

Denoted at C1 is an axis which extends through the surface vertex (sagittal plane vertex) P1 of the upper region O and which is parallel to the optical reference axis CO. Similarly, denoted at C2 is an axis which extends through the surface vertex (sagittal plane vertex) P2 of the lower region U and which is parallel to the optical reference axis CO.

In this embodiment, when the imaging magnification of the imaging optical system LB with respect to the sub-scan sectional plane is denoted by $\beta s$, the following condition is satisfied.

$$1.0 < |\beta s| < 3.5 \tag{1}$$

Condition (1) above regulates the imaging magnification $\beta s$ of the imaging optical system LB with respect to the sub-scan sectional plane. If the upper limit of Condition (1) is exceeded the imaging lens comes too close to the optical deflector 5. If the upper and lower light beams are going to be separated from each other on the surface of the imaging lens 6, the oblique incidence angle with respect to the sub-scan direction becomes too large. As a result, reducing the wavefront aberration distortion (spot rotation) becomes difficult to accomplish.

If on the other hand the lower limit of Condition (1) is not reached, the imaging lens 6 comes too close to the scan surface 8, such that the optical path design for directing the upper and lower light beams from the imaging lens 6 toward corresponding photosensitive drums becomes difficult.

In this embodiment, the imaging magnification $\beta s$ of the imaging optical system LB with respect to the sub-scan sectional plane is $\beta s = -2.484$, and this satisfies Condition (1).

More preferably, Condition (1) may be changed as follows.

$$1.5 < |\beta s| < 2.6 \tag{1a}$$

Figure 8:
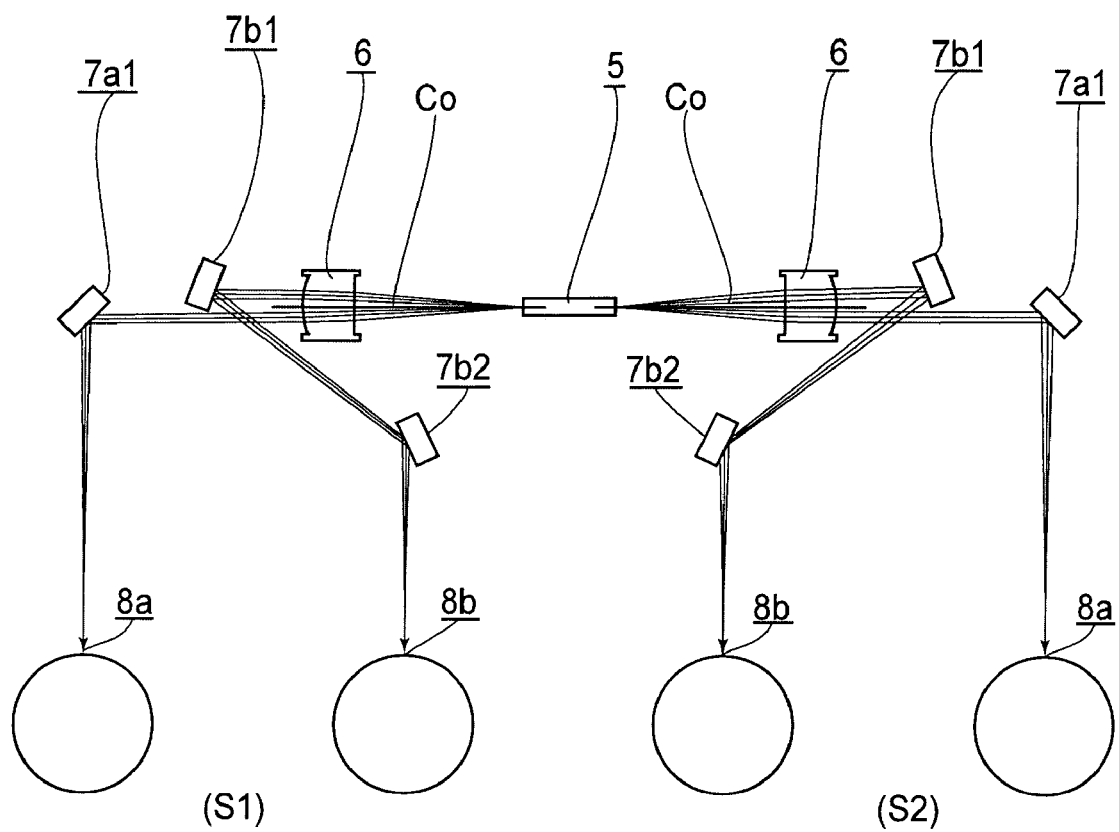
FIG. 8 is a schematic view of a main portion of a color image forming apparatus according to the first embodiment of the present invention.

The structure according to this embodiment is that: two, upper and lower light beams with respect to the sub-scan direction are incident on one and the same deflecting surface, and these light beams are imaged upon different scan surfaces (see FIGS. 2 and 8).

Hence, a light-path bending mirror should be disposed between the scan surface and a final lens closest to the scan surface, to thereby split the light path. To this end, the points where the light beams are imaged upon the scan surfaces should desirably have a spacing of 3 mm or more as measured in the sub-scan direction.

If the points where the light beams are imaged on the scan surfaces are close to each other, even though these light beams are separate from each other on the lens surface, they get close to each other as the scan surface nears. Hence, splitting the light path by using a path bending mirror will be difficult to do.

In this embodiment, the points where the light beams are imaged on the scan surfaces are spaced from each other by a spacing of 6.58 mm as measured in the sub-scan direction. Thus, by a path bending mirror, the light path can be split easily.

The imaging lens 6 of this embodiment has a thickness 10.95 mm. This is significantly thin as compared with the imaging lens (thickness 17.9 mm) of Patent Document No. 3 mentioned hereinbefore.

Reducing the thickness of the imaging lens 6 is very effective that: when it is going to be made of a plastic material, the molding tact is reduced; the inner refractive index distribution is reduced; and birefringence is reduced. In this embodiment, by optimizing the surface shape in the upper region O and the lower region U of the light exit surface R2 of the imaging lens 6 as described above, the thickness of the imaging lens 6 can be made small.

Figure 4:
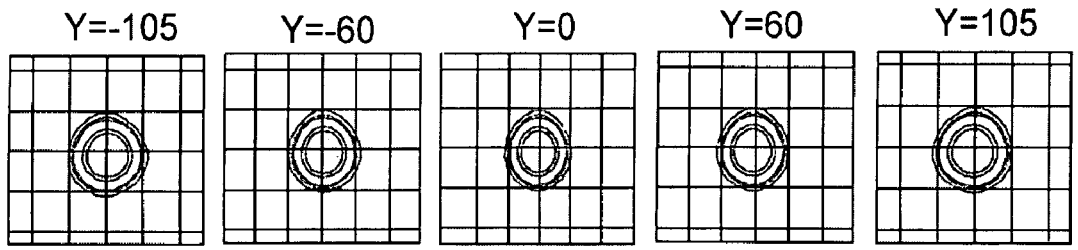
FIG. 4 is a schematic and sectional view for explaining spot shapes on a scan surface to be scanned, in the first embodiment of the present invention.

FIG. 4 illustrates, in sectional view, the shape of spots on the scan surface, from an on-axis portion toward the outermost abaxial portion. In FIG. 4, five contour lines of 5%, 10%, 13.5%, 36.8% and 50% of the peak light quantity are used. Denoted at Y is the image height.

Generally, if a light beam is incident on the deflecting surface of an optical deflector obliquely with respect to the sub-scan sectional plane, spot rotation (twist of wavefront aberration) occurs at the abaxial region.

In consideration of it, in this embodiment, the meridional lines of the upper and lower regions O and U of the light exit surface R2 of the imaging lens 6 are shifted in the sub-scan direction (Z direction) toward the side where the light beam passes, by an amount 0.935949 mm. With this arrangement, in this embodiment, spot rotation from the axial area to the outermost abaxial area is reduced significantly.

Next, the manner how to join the two different regions at a boundary area of the light exit surface R2 of the imaging lens 6, will be described.

Conventionally, such as the imaging lens disclosed in Patent Document No. 1, different regions of the lens surface are joined discontinuously. If this is done, however, sink or shrink may be produced around the discontinuous portion during the lens molding, and surface precision will be degraded considerably at the discontinuous portion.

In order to minimize the sink or shrink, the surface shapes of the upper and lower regions O and U with respect to the optical reference axis CO should be joined smoothly.

In this embodiment, the light beam passes outside the surface vertex (sagittal plane vertex) P1 or the surface vertex (sagittal plane vertex) P2 of the light exit surface R2, and hence the portion between the surface vertices P1 and P2 (i.e., boundary surface) is joined along a straight line.

The straight line passing through the surface vertex P1 or P2 is a tangential line of each lens surface, such that the lens surface and the boundary surface can be joined together quite smoothly.

As result of this, in this embodiment, occurrence of sink or shrink during lens molding can be avoided, and high-quality lenses can be produced stably.

Figure 5:
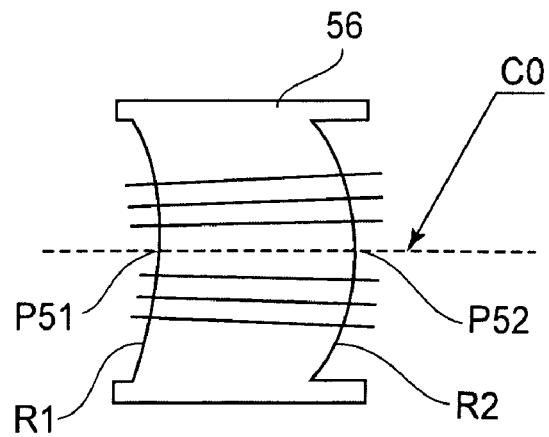
FIG. 5 is a schematic and sectional view of an imaging lens in a comparative example.

FIG. 5 is a sectional view, along the sub-scan sectional plane, of a main portion of an imaging lens 56 with respect to the sub-scan direction, as a comparative example.

In FIG. 5, the light entrance surface R1 has a negative (concave) power, and the surface vertex P51 extends through the optical reference axis CO. The light exit surface R2 has a positive (convex) power, and the surface vertex P52 extends through the optical reference axis CO.

In the imaging lens 56 of FIG. 5, both the light entrance surface R1 and the light exit surface R2 are formed with a power, by which spot rotation is reduced.

Figure 6:
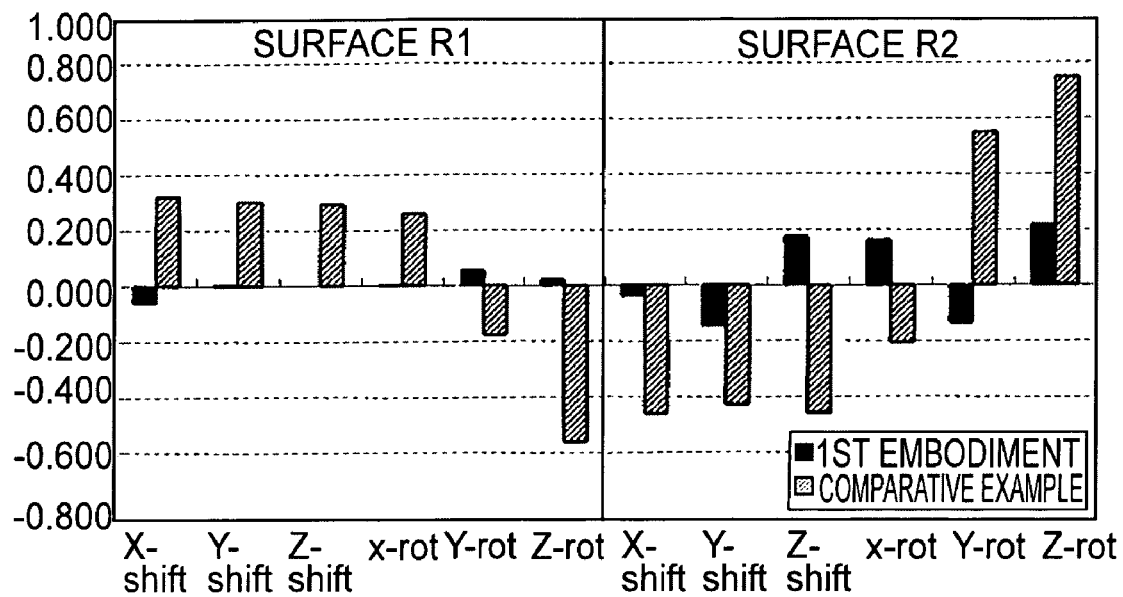
FIG. 6 is a graph for explaining the image-plane sensitivity with respect to the sub-scan direction, in the first embodiment and a comparative example.

FIG. 6 is a graph showing the displacement amount of the image plane at the outermost abaxial portion (Y=105 mm) with respect to the sub-scan sectional plane, when in this embodiment and the comparative example of FIG. 5 the lens surfaces are shifted by 0.03 mm and tilted by 3 minutes.

It is seen from FIG. 6 that, in the imaging lens 56 of the comparative example, since both the light entrance surface R1 and the light exit surface R2 have a strong power, they are very sensitive.

On the other hand, in the imaging lens 6 of this embodiment, because the light entrance surface R1 has no power (i.e., flat) with respect to the sub-scan sectional plane, the sensitivity is reduced considerably.

Hence, it has been confirmed that, as compared with reducing the spot rotation on the basis of bending having been conventionally done, an imaging lens wherein the meridional line is shifted to reduce the spot rotation has a lower sensitivity, such that it can be very easily produced by the molding process.

Figure 7:
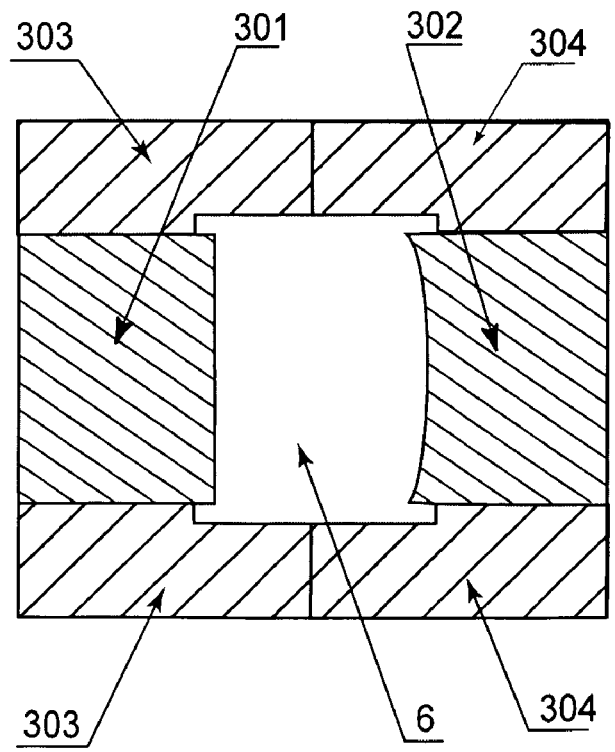
FIG. 7 is a schematic view for explaining a mold structure according to the first embodiment of the present invention.

FIG. 7 is a schematic view of metal molds for molding a lens in accordance with this embodiment of the present invention.

In FIG. 7, denoted at 301 and 302 are mirror-surface pieces, and denoted at 303 and 304 are holding pieces. Conventionally, in order to integrate the mirror-surface pieces provided in relation to different, upper and lower regions, the precision of these pieces must be controlled very strictly to assure relative positioning.

As compared therewith, in this embodiment, the surface shapes of the upper and lower regions O and U are simultaneously produced on one mirror-surface pieced. Therefore, basically there is no relative difference between theses surfaces.

Furthermore, the light entrance side R1 has no power, and this enables a broader precision for any relative difference concerning the light entrance surface R1 and the light exit surface R2.

Furthermore, in the imaging lens 6 of this embodiment, the optical performance may be loosened in regard to the f-θ characteristic and the scan-line bend. This is because, by controlling the spot position on the basis of recent technology of electric image correction, an image equivalent to one being optically corrected is obtainable. Hence, the imaging lens 6 of this embodiment may be incorporated into an image forming apparatus, in the combination of electric image correction and optical image correction.

FIG. 8 is a schematic view, along a sub-scan sectional plane, of an example wherein the imaging lens 6 described hereinbefore is applied to an imaging optical system of an image forming apparatus having two stations S1 and S2.

In FIG. 8, two light beams from the optical deflector 5 pass through the imaging lens 6. One of these light beams which passes above the optical reference axis CO is bent twice by path bending mirrors 7b1 and 7b2 and, after that, it is incident on an inner photosensitive drum 8b.

On the other hand, the other light beam that passes under the optical reference axis CO is bent once by a path bending mirror 7a1 and, subsequently, it is incident on an outer photosensitive drum 8a.

In this embodiment, only one common imaging lens 6 is used to two, upper and lower light beams with respect to the optical reference axis CO, and by shifting the meridional lines of respective regions of the lens surface symmetrically and upwardly/downwardly with respect to the optical reference axis CO, spot rotation is reduced.

In conventional optical scanning systems, long lenses have to be used in relation to respective light beams and, in order to reduce the spot rotation, the shift amount and tilt amount have to be changed respectively in accordance with the oblique incidence angle of each beam with respect to the sub-scan direction.

Hence, in accordance with this embodiment of the present invention, the number of components to be used can be reduced and the structure of the system as a whole can be simplified significantly.

Embodiment

Figure 9:
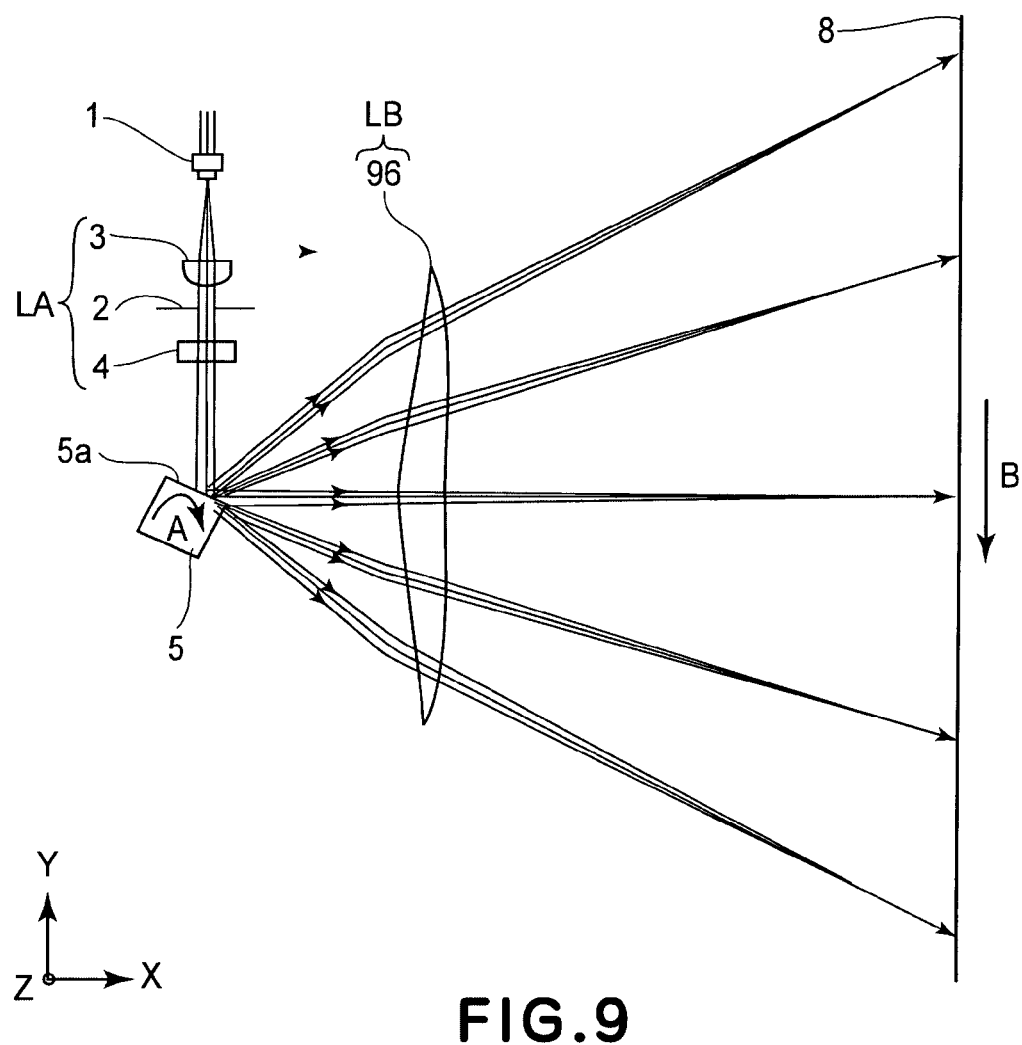
FIG. 9 is a sectional view, along a main-scan sectional plane, of an optical scanning system according to a second embodiment of the present invention.
Figure 10:
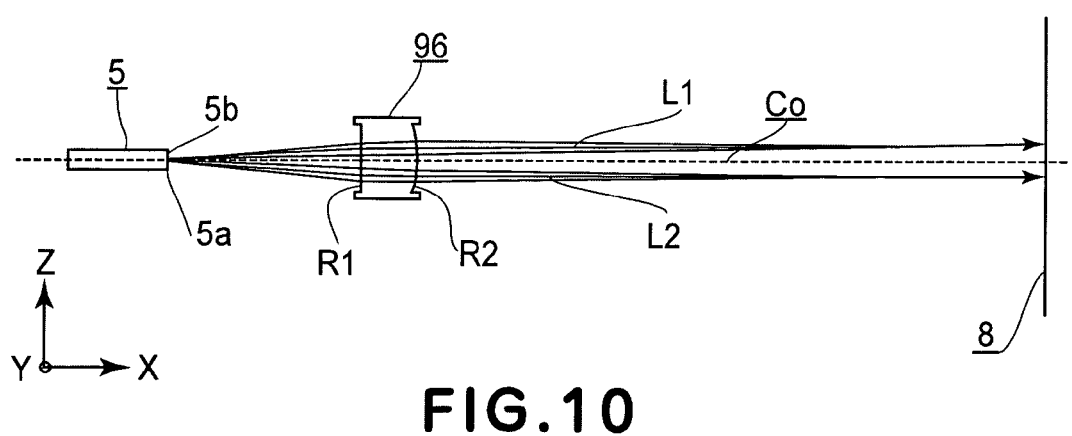
FIG. 10 is a sectional view, along a sub-scan sectional plane, of the optical scanning system according to the second embodiment of the present invention.

FIG. 9 is a sectional view along a main-scan direction (main-scan sectional plane) of a main portion of an optical scanning system according to a first embodiment of the present invention. FIG. 10 is a schematic view along a sub-scan direction (sub-scan sectional plane) of the main portion of the optical scanning system according to the first embodiment of the present invention. In FIGS. 9 and 10, the components corresponding to those shown in FIGS. 1 and 2 are denoted by like numerals.

Here, the optical reference axis CO corresponds to an axis which extends through the reflection point 5b (actually, in this embodiment, two reflection points are superposed) on one and the same deflecting surface 5a of the two light beams L1 and L2 incident thereupon and also which is perpendicular to that deflecting surface 5a.

This embodiment differs from the first embodiment in that each the light entrance surface R1 and the light exit surface R2 of an imaging lens 96 is formed with a shape determined in accordance with different functions related to different regions thereof, with respect to the sub-scan sectional plane.

Furthermore, the meridional line of each region defined by that function is shifted, with respect to the sub-scan sectional plane, toward the same side relative to the optical reference axis CO where the light beam is passing and, additionally, the meridional line is curved toward the sub-scan direction.

The structure and optical function of the remaining portion are basically similar to the first embodiment, and hence similar advantageous results are obtainable in this embodiment.

More specifically, denoted at LB in FIG. 9 is an imaging optical system having a light collecting function and f-θ characteristic. It consists of a single imaging lens (f-θ lens) 96 made of a plastic material.

In this embodiment, like the first embodiment, two light beams deflected by the optical deflector 5 pass through different regions of the imaging lens 96 with respect to the sub-scan sectional plane.

In addition to this, each meridional line defined by the function is shifted and yet curved, with respect to the sub-scan sectional plane and relative to the optical reference axis CO, to the same side of the optical reference axis CO where the light beam passes.

In this embodiment, by shifting and bending the meridional line of each region toward the sub-scan direction as described above, distortion of the wavefront aberration to be produced due to oblique incidence of two light beams upon the deflecting surface 5a of the optical deflector 5 is reduced.

With regard to the slightly convergent light beam provided by the collimator lens 3, in this embodiment, if there is no cylindrical lens 4 and an imaging lens 6, it will be focused at a position of 299.6 mm which is from the deflecting point of the optical deflector 5 toward the scan surface 8.

In this embodiment, like the first embodiment, an infrared light source that provides a light beam of a wavelength λ=790 nm is used as the light source means, and curvature field both in the main-scan direction and the sub-scan direction is well corrected throughout the effective scan region.

In this embodiment, two light beams L1 and L2 (i.e., two light beams incident on the deflecting surface 5a) to be deflected by the deflecting surface 5a with respect to the sub-scan sectional plane of FIG. 10 are deflected thereby in upward and downward directions as viewed in the drawing, at angles of ±3 deg. with respect to the optical reference axis CO. Subsequently, these light beams enter into the imaging lens 6, common to them, and they are directed to the photosensitive drum 8 surface.

Table 2 below shows the optical arrangement of the optical elements as well as the surface configuration of the optical elements in Numerical Example 2 according to the second embodiment of the present invention.

TABLE 2

DESIGN DATA

WAVELENGTH & REFRACTIVE INDEX

| | | |
|---|---|---|
| Used Wavelength | λ (nm) | 790 |
| Refractive Index | | 1.52781 |

Disposition

| | | |
|---|---|---|
| Main-Scan Laser Incidence Angle (deg) | | 90 |
| Sub-Scan Laser Incidence Angle (deg) | | 3 |
| Largest Light-Ray Emission Angle (deg) | | +/−40.1 |
| Polygon Center Coordinates (mm) | Main Scan | −5.412 |
| | Sub Scan | −4.588 |
| No. of Polygonal Surfaces | | 4 |
| Polygon Circumscribing Circle Diameter (mm) | | φ 20 |

TABLE 2-continued

DESIGN DATA

| | |
|---|---|
| Distance from Deflection Reference Point to Toric Lens 6 | 44.5 |
| Toric Lens 6 Center Thickness | 10.5 |
| Distance from Toric Lens 6 to Scan Surface | 117.93318 |
| Distance from Deflection Reference Point to Scan Surface | 172.93318 |
| Effective Scan Width | 210 |

| | 1st Surface | 2nd Surface |
|---|---|---|
| ASPHERICAL SURFACE DATA | | |
| R | 8.06130E+01 | 1.88210E+02 |
| K | −8.38139E+00 | −2.32544E+00 |
| B4 | −1.80233E−06 | −2.64865E−06 |
| B6 | 7.06712E−10 | 7.31748E−10 |
| B8 | −1.49007E−13 | −1.45674E−13 |
| B10 | 1.53314E−17 | 1.68718E−17 |
| r0 | −1.76606E+01 | −1.12452E+01 |
| D2s | 1.35638E−03 | 4.81962E−04 |
| D4s | 6.36320E−07 | −8.54231E−08 |
| D6s | 1.15512E−10 | 1.90525E−11 |
| D8s | 6.57447E−15 | 6.23692E−15 |
| D10s | 4.73609E−17 | −2.55840E−18 |
| D2e | 1.32603E−03 | 4.84293E−04 |
| D4e | 6.49683E−07 | −8.71322E−08 |
| D6e | 1.20603E−10 | 2.36506E−11 |
| D8e | −1.21255E−14 | 6.79260E−15 |
| D10e | 7.04720E−17 | −3.03342E−18 |
| MERIDIONAL-LINE FUNCTION | | |
| A0 | 2.95130E+00 | 2.66012E+00 |
| A2 | 4.97203E−04 | 2.13437E−04 |
| A4 | −2.50821E−07 | −1.94120E−07 |
| A6 | −4.49020E−11 | 4.12972E−11 |
| A8 | 0 | 0 |
| A10 | 0 | 0 |

Subscript "s": laser-side
Subscript "e": counter laser-side

The numerical example 2 shown in Table 2 concerns the surface shape through which the upper light beam L1, with respect to the optical reference axis CO and as viewed in FIG. 10, passes. The surface shape through which the lower light beam L2 with respect to the optical reference axis CO and as viewed in FIG. 10, and the surface shape through which the upper light beam L1 with respect to the optical reference axis CO are symmetrical with each other. Namely, in these regions, the meridional lines are shifting by opposite amounts with respect to the optical reference axis CO.

Figure 11:
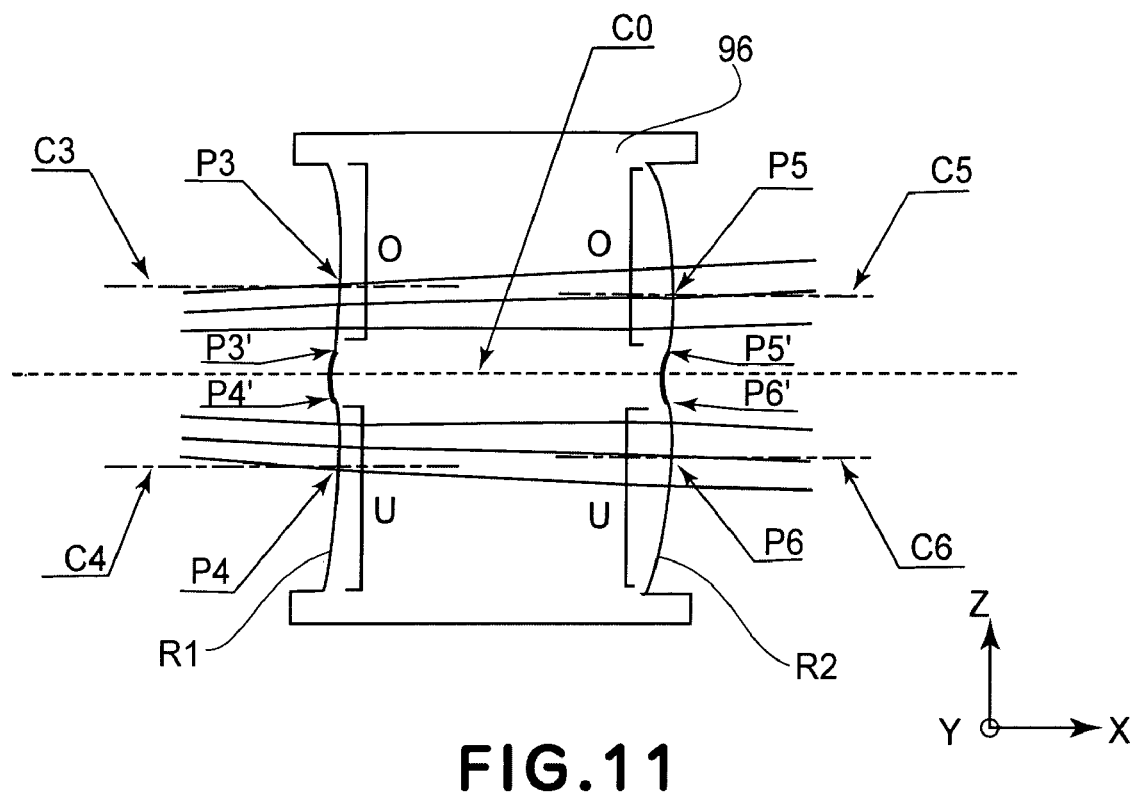
FIG. 11 is a sectional view, along the sub-scan sectional plane, of an imaging lens according to the second embodiment of the present invention.

FIG. 11 is an enlarged view, along the sub-scan sectional plane, of the imaging lens 96 according to this embodiment of the present invention.

In FIG. 11, the light entrance surface R1 of the imaging lens 96 has a negative (concave) power with respect to the sub-scan sectional plane, and it is divided into two regions, namely, upper region O and lower region U, with respect to the optical reference axis CO, as viewed in the drawing. On the other hand, the light exit surface R2 has a positive (convex) power and, like the light entrance surface R1, it is divided into two regions, that is, upper region O and lower region U, with respect to the optical reference axis CO, as viewed in the drawing.

The light entrance surface R1 and the light exit surface R2 each being divided into two regions O and U have a shape as determined in accordance with different functions corresponding to the divided regions, respectively.

Furthermore, the meridional line of each region as defined by that function is shifted and curved so as to reduce distortion of the wavefront aberration to be produced as a result of oblique incidence of two light beams on the deflecting surface 5a of the optical deflector 5.

Denoted at C3 is an axis which extends through the surface vertex P3 of the upper region O of the light entrance surface R1 and which is parallel to the optical reference axis CO. Similarly, denoted at C4 is an axis which extends through the surface vertex P4 of the lower region U and which is parallel to the optical reference axis CO. Denoted at C5 is an axis which extends through the surface vertex P5 of the upper region O of the light exit surface R2 and which is parallel to the optical reference axis CO. Similarly, denoted at C6 is an axis which extends through the surface vertex P6 of the lower region U and which is parallel to the optical reference axis CO.

The imaging magnification βs of the imaging optical system LB according to this embodiment, with respect to the sub-scan sectional plane, is βs=−1.944, and this satisfies Condition (1).

The present embodiment uses such structure that: two, upper and lower light beams with respect to the sub-scan direction are incident on one and the same deflecting surface, and these light beams are imaged upon different scan surfaces. Hence, a light-path bending mirror should be disposed between the scan surface and a final lens closest to the scan surface, to thereby split the light path. To this end, the points where the light beams are imaged upon the scan surfaces should desirably have a spacing of 3 mm or more as measured in the sub-scan direction.

If the points where the light beams are imaged on the scan surfaces are close to each other, even though these light beams are separate from each other on the lens surface, they get close to each other as the scan surface nears. Hence, splitting the light path by using a path bending mirror will be difficult to do.

In this embodiment, the points where the light beams are imaged on the scan surfaces are spaced from each other by a spacing of 14.16 mm as measured in the sub-scan direction. Thus, by a path bending mirror, the light path can be split easily.

The imaging lens 96 of this embodiment has a thickness 10.5 mm. This is significantly thin as compared with the imaging lens (thickness 17.9 mm) of Patent Document No. 3 mentioned hereinbefore.

Reducing the thickness of the imaging lens 96 is very effective that: when it is going to be made of a plastic material, the molding tact is reduced; the inner refractive index distribution is reduced; and birefringence is reduced. In this embodiment, by optimizing the surface shape in the upper region O and the lower region U of the light exit surface R2 of the imaging lens 96 as described above, the thickness of the imaging lens 96 can be made small.

Figure 12:
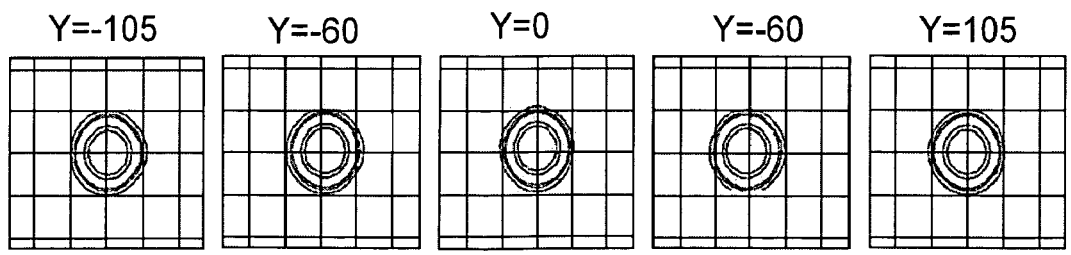
FIG. 12 is a schematic and sectional view for explaining spot shapes on a scan surface to be scanned, in the second embodiment of the present invention.

FIG. 12 illustrates, in sectional view, the shape of spots on the scan surface, from an on-axis portion toward the outermost abaxial portion. In FIG. 12, five contour lines of 5%, 10%, 13.5%, 36.8% and 50% of the peak light quantity are used. Denoted at Y is the image height.

Generally, if a light beam is incident on the deflecting surface of an optical deflector obliquely with respect to the sub-scan sectional plane, spot rotation (twist of wavefront aberration) occurs at the abaxial region.

In consideration of it, in this embodiment, the meridional lines of the upper and lower regions O and U of the light exit surface R2 of the imaging lens 96 are bent and, also they are shifted in the sub-scan direction (Z direction) toward the side where the light beam passes, by an amount of 2.9523 mm for the light entrance surface R1 and by an amount of 2.66012 mm for the light exit surface R2. With this arrangement, in this embodiment, spot rotation from the axial area to the outermost abaxial area is reduced significantly.

Next, the manner how to join the two different regions at a boundary area in each of the light entrance surface R1 and the light exit surface R2 of the imaging lens 96, will be described.

As shown in FIG. 11, the surface vertices P3, P4, P5 and P6 are present at positions where the light beam passes. Hence, the joining method as of the first embodiment is unavailable here.

In this embodiment, therefore, a method of smoothly joining the upper and lower lens surfaces at a position other than the position where the light beam passes is attempted.

In the light entrance surface R1, positions which are at a distance of 0.8 mm upwardly and downwardly from the optical reference axis CO are taken as P3' and P4', respectively. At these positions, the lens surface and the boundary surface are going to be joined smoothly.

Here, the wording "joining smoothly" means that the surface shapes of the lens surface and the boundary surface have the same first-order differentiation coefficient.

Figure 13:
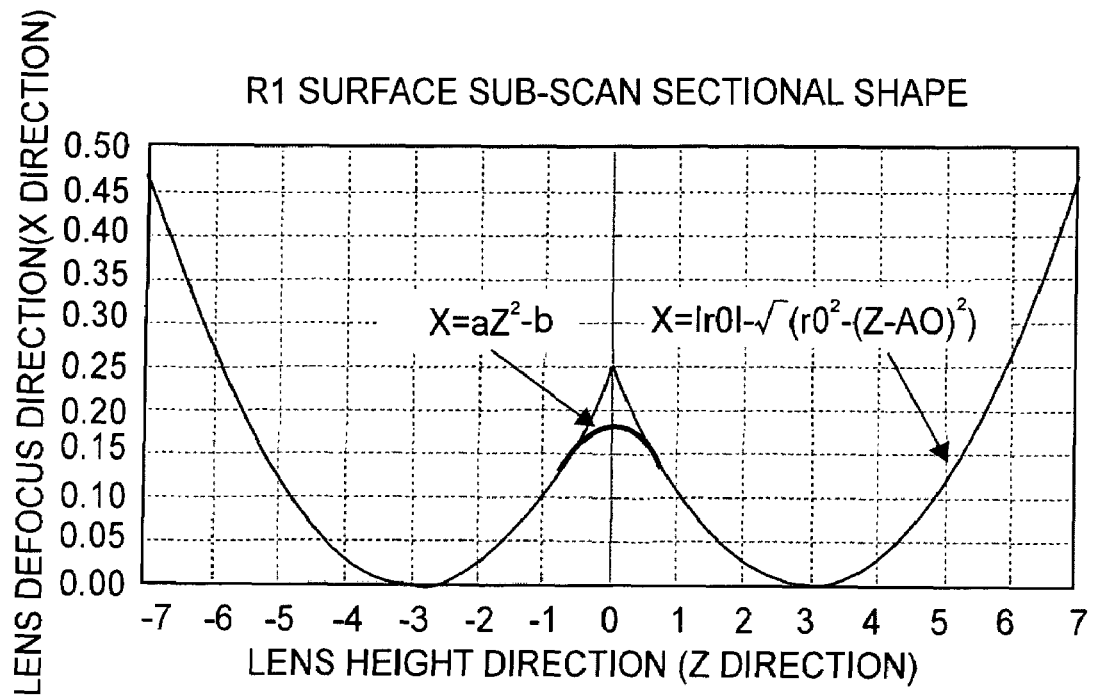
FIG. 13 is a graph for explaining the shape of the light entrance surface with respect to the sub-scan sectional plane, according to the second embodiment of the present invention.

FIG. 13 is a graph, showing the surface shape of the light entrance surface R1. In FIG. 13, the axis of abscissa corresponds to the lens height direction (Z direction), and the axis of ordinate corresponds to the lens defocus direction (X direction). Further, the positive side of the axis of ordinate is defined as the optical deflector 5 side. The optical reference axis CO is taken as the origin of the axis of abscissa, and the lens surface vertices P3 and P4 are taken as the origin of the axis of ordinate.

If the curvature radius at Y=0 with respect to the sub-scan direction is denoted by $r_0$ and the meridional-line shift amount is denoted by $A_0$, then the surface shape of the lens surface with respect to the sub-scan sectional plane can be expressed as follows.

$$X=|r_0|-\sqrt{(r_0^2-(Z-A_0)^2)}$$

If $r_0=-17.6606$ and $A_0=2.9513$ are substituted into this and first-order differentiation coefficient is calculated in terms of Z=0.8, a solution dX/dZ=−0.12273 is obtainable.

Where the boundary surface is expressed in terms of a quadratic function (quadratic spline function) and, if $X=aZ^2+b$, then dX/dZ=2aZ=1.6a. Since 1.6a=−0.12273, it follows that a=−0.0767.

Further, in order that quadratic function $X=-0.0767Z^2+b$ equals to an arcuate X (which is expressed below) in terms of Z=0.8, a solution b=0.180609 is calculated.

$$X=17.6606-\sqrt{(17.6606^2-(Z-2.9513)^2)}$$

Therefore, the quadratic function which expresses the boundary surface is determined as follows:

$$X=-0.0767Z^2+0.180609$$

Similarly, with regard to the light exit surface R2, if it is going to be joined smoothly at a position of 0.8 mm, for example, from the optical reference axis CO, it follows that:

$$X=-0.10483Z^2+0.222003$$

FIG. 13 illustrates two curves, in superposition, corresponding to a case where arcuate shapes are directly joined and a case where the surfaces are smoothly joined (thick line).

Smooth joining will be advantageous in respect to the molding stability since it enhances smooth flow of the resin material.

Figure 14:
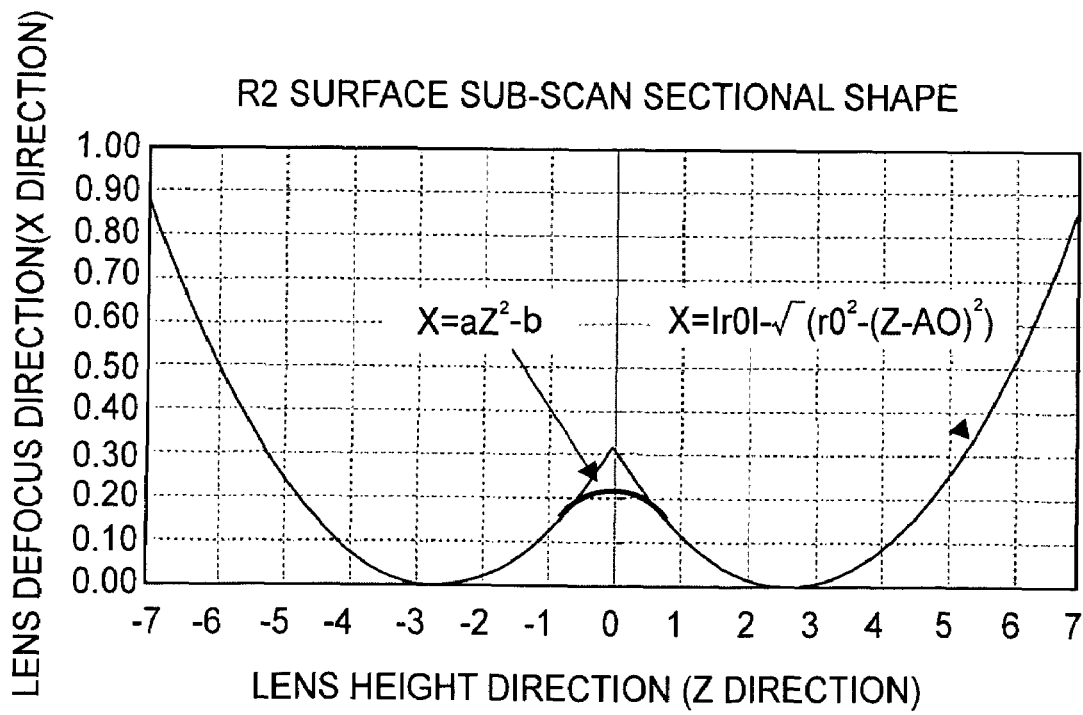
FIG. 14 is a graph for explaining the shape of the light exit surface with respect to the sub-scan sectional plane, according to the second embodiment of the present invention.

FIG. 14 is a graph, showing the surface shape of the light exit surface R1 of the imaging lens 96. Since the surface shape of the light exit surface R2 of the imaging lens 96 is similar to that of the light entrance surface R1, description therefor will be omitted here.

In this embodiment as described above, the shape at the boundary region is such that, with respect to the sub-scan sectional plane, the value of first-order differentiation is continuous, and that the boundary region is joined in accordance with a spline function.

Although in this embodiment the boundary surface is expressed in terms of quadratic function, smooth joining is not limited to this. A spline function using higher order may be used, with a result of similar advantageous effects.

Embodiment

Figure 15:
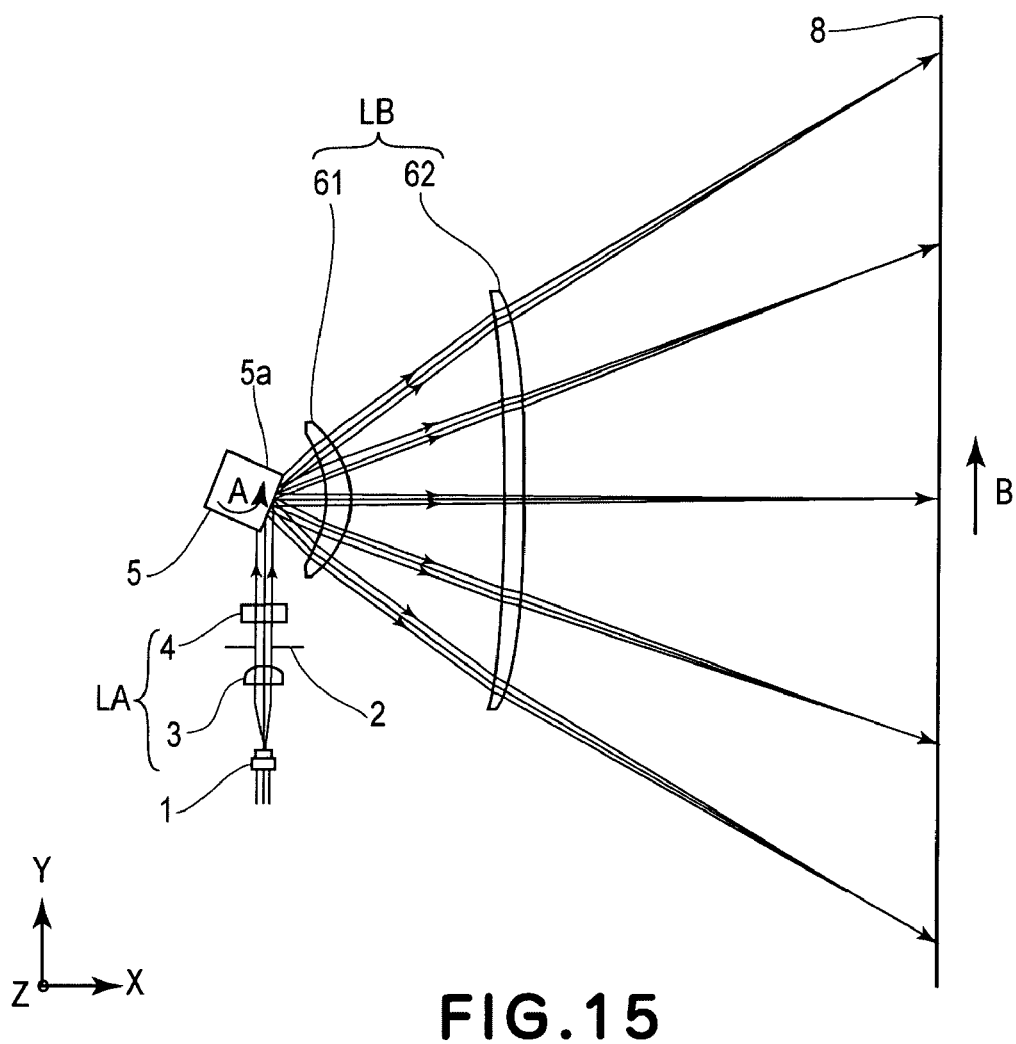
FIG. 15 is a sectional view, along a main-scan sectional plane, of an optical scanning system according to a third embodiment of the present invention.
Figure 16:
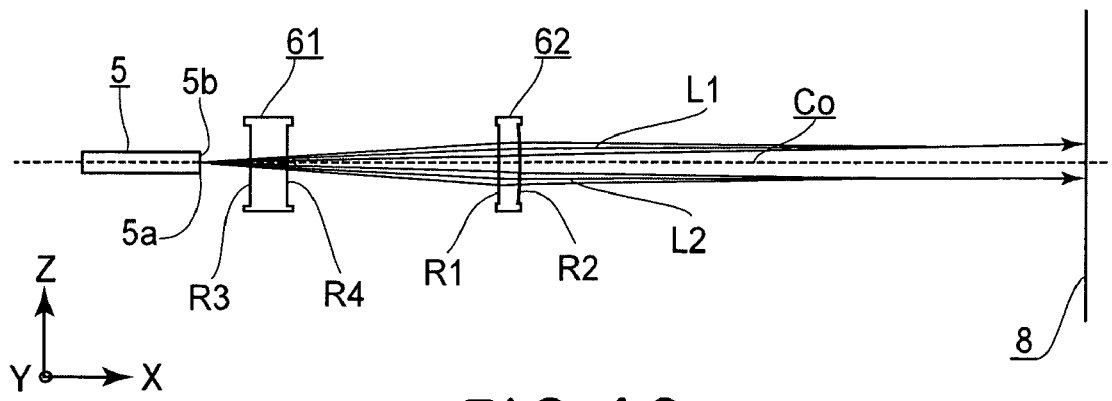
FIG. 16 is a sectional view, along a sub-scan sectional plane, of the optical scanning system according to the third embodiment of the present invention.

FIG. 15 is a sectional view along a main-scan direction (main-scan sectional plane) of a main portion of an optical scanning system according to a third embodiment of the present invention. FIG. 16 is a schematic view along a sub-scan direction (sub-scan sectional plane) of the main portion of the optical scanning system according to the third embodiment of the present invention. In FIGS. 15 and 16, the components corresponding to those shown in FIGS. 1 and 2 are denoted by like numerals.

This embodiment differs from the first embodiment in that the imaging optical system LB comprises first and second imaging lenses 61 and 62. Additionally, the light exit surface R2 of the second imaging lens 62 of the imaging optical system LB, at the scan surface 8 side, is formed with a shape defined in accordance with different functions corresponding to different regions, respectively, with respect to the sub-scan sectional plane.

Furthermore, a meridional line of each region defined by that function is shifted, with respect to the sub-scan sectional plane, toward the same side of the optical reference axis CO where the light beam passes, and also the meridional line is curved. The structure and optical function of the remaining portion are basically similar to that of the first embodiment, and similar advantageous results are obtainable in this embodiment.

Here, the optical reference axis CO corresponds to an axis which extends through the reflection point 5b (actually, in this embodiment, two reflection points are superposed) on one and the same deflecting surface 5a of the two light beams L1 and L2 incident thereupon and also which is perpendicular to that deflecting surface 5a.

In FIG. 15, denoted at LB is an imaging optical system having a light collecting function and f-θ characteristic. It consists of first and second imaging lenses (f-θ lenses) 61 and 62 made of a plastic material. The imaging optical system functions to image the light beam, reflectively deflected by the optical deflector 5 and based on imagewise information, upon the surface of a photosensitive drum (scan surface to be scanned) 8, and also to provide an optically conjugate relationship between the deflecting surface 5a of the optical deflector 5 and the photosensitive drum surface 8, with respect to the sub-scan sectional plane, to thereby compensate any surface tilt of the deflecting surface.

In this embodiment, the light exit surface R2 of the second imaging lens 62 of the imaging optical system LB, at the scan surface 8 side, is formed with a shape defined in accordance with different functions corresponding to different regions, respectively, with respect to the sub-scan sectional plane, as in the first embodiment.

Furthermore, the meridional line defined by that function is shifted, with respect to the sub-scan sectional plane, toward the same side relative to the optical reference axis CO where the light beam is passing and, additionally, the meridional line is curved.

Thus, in this embodiment, by shifting and bending the meridional line of each region toward the sub-scan direction as described above, distortion of the wavefront aberration to be produced due to oblique incidence of two light beams upon the deflecting surface 5a of the optical deflector 5 is reduced.

In this embodiment, like the first embodiment, an infrared light source that provides a light beam of a wavelength λ=790 nm is used as the light source means, and curvature field both in the main-scan direction and the sub-scan direction is well corrected throughout the effective scan region.

In this embodiment, two light beams L1 and L2 (i.e., two light beams incident on the deflecting surface 5a) to be deflected by the deflecting surface 5a with respect to the sub-scan sectional plane of FIG. 16 are deflected thereby in upward and downward directions as viewed in the drawing, at angles of ±2 deg. with respect to the optical reference axis CO. Subsequently, these light beams enter into the first and second imaging lenses 61 and 62, common to the light beams L1 and L2, and they are directed to the photosensitive drum 8 surface.

In this embodiment, each of the light entrance surface R1 and the light exit surface R2 of the first imaging lens 61 has an arcuate shape with respect to the sub-scan direction, with the optical reference axis CO being set along the optical axis.

Furthermore, the light entrance surface R1 of the second imaging lens 62 has a flat shape, while the light exit surface thereof is formed with an arcuate surface shape wherein, in the upper and lower regions thereof with respect to the optical reference axis CO, the meridional lines are shifted in opposite directions.

In this embodiment as described, the meridional line of each region of the surface where the power is concentrated with respect to the sub-scan sectional plane (i.e., light exit surface R2 of the second imaging lens 62) is shifted toward the sub-scan direction, like the first embodiment, and distortion of the wavefront aberration (i.e., spot rotation) is reduced thereby.

Table 3 below shows the optical arrangement of the optical elements as well as the surface configuration of the optical elements in Numerical Example 3 according to the third embodiment of the present invention.

TABLE 3

DESIGN DATA

| WAVELENGTH & REFRACTIVE INDEX | | |
|---|---|---|
| Used Wavelength | λ (nm) | 790 |
| Refractive Index (Lens 61) | | 1.523972 |
| Refractive Index (Lens 62) | | 1.523972 |
| Disposition | | |
| Main-Scan Laser Incidence Angle (deg) | | 90 |
| Sub-Scan Laser Incidence Angle (deg) | | 2 |
| Largest Light-Ray Emission Angle (deg) | | +/−46.0 |
| Polygon Center Coordinates (mm) | Main Scan | −5.38259 |
| | Sub Scan | 4.61741 |
| No. of Polygonal Surfaces | | 4 |
| Polygon Circumscribing Circle Diameter (mm) | | φ 20 |

TABLE 3-continued

DESIGN DATA

| | |
|---|---|
| Distance from Deflection Reference Point to Toric Lens 61 | 13.5 |
| Toric Lens 61 Center Thickness | 6 |
| Distance between Toric Lenses 61 and 62 | 35.14 |
| Toric Lens 62 Center Thickness | 4 |
| Distance from Toric Lens 62 to Scan Surface | 95.20905 |
| Distance from Deflection Reference Point to Scan Surface | 153.84905 |
| Effective Scan Width | 210 |

| | 1st Surface | 2nd Surface |
|---|---|---|
| ASPHERICAL SURFACE DATA (LENS 61) | | |
| R | −2.64928E+01 | −1.93577E+01 |
| K | −6.80475E+00 | −3.87248E+00 |
| B4 | −1.37334E−05 | −4.17798E−05 |
| B6 | 7.95427E−08 | 1.65527E−07 |
| B8 | −5.98755E−10 | −4.87590E−10 |
| B10 | 1.01488E−12 | 3.40011E−13 |
| r0 | −1.00000E+03 | −1.00000E+03 |
| D2s | 0 | 0 |
| D4s | 0 | 0 |
| D6s | 0 | 0 |
| D8s | 0 | 0 |
| D10s | 0 | 0 |
| D2e | 0 | 0 |
| D4e | 0 | 0 |
| D6e | 0 | 0 |
| D8e | 0 | 0 |
| D10e | 0 | 0 |
| ASPHERICAL SURFACE DATA (LENS 62) | | |
| R | −3.40577E+02 | 6.06027E+02 |
| K | 0 | −2.43528E+03 |
| B4 | 0 | −2.01648E−06 |
| B6 | 0 | 5.80917E−10 |
| B8 | 0 | −1.08080E−13 |
| B10 | 0 | 7.62475E−18 |
| r0 | 0 | −1.84689E+01 |
| D2s | 0 | 2.78332E−04 |
| D4s | 0 | −1.72137E−07 |
| D6s | 0 | 6.80433E−11 |
| D8s | 0 | −1.00369E−14 |
| D10s | 0 | 0 |
| D2e | 0 | 2.51455E−04 |
| D4e | 0 | −1.46771E−07 |
| D6e | 0 | 5.36569E−11 |
| D8e | 0 | −7.13486E−15 |
| D10e | 0 | 0 |
| MERIDIONAL-LINE FUNCTION (LENS 61) | | |
| A0 | 0 | 0 |
| A2 | 0 | 0 |
| A4 | 0 | 0 |
| A6 | 0 | 0 |
| A8 | 0 | 0 |
| A10 | 0 | 0 |
| MERIDIONAL-LINE FUNCTION (LENS 62) | | |
| A0 | 0 | 8.41950E−01 |
| A2 | 0 | −1.30852E−06 |
| A4 | 0 | 0 |
| A6 | 0 | 0 |
| A8 | 0 | 0 |
| A10 | 0 | 0 |

Subscript "s": laser-side
Subscript "e": counter laser-side

The numerical example 3 shown in Table 3 concerns the surface shape through which the upper light beam, with respect to the optical reference axis CO and as viewed in FIG. 16, passes.

The surface shape through which the lower light beam L2 with respect to the optical reference axis CO and as viewed in FIG. 16, and the surface shape through which the upper light beam L1 with respect to the optical reference axis CO are symmetrical with each other. Namely, in these regions, the amounts of shift of the meridional lines are inverted upwardly/downwardly with respect to the optical reference axis CO.

Figure 17:
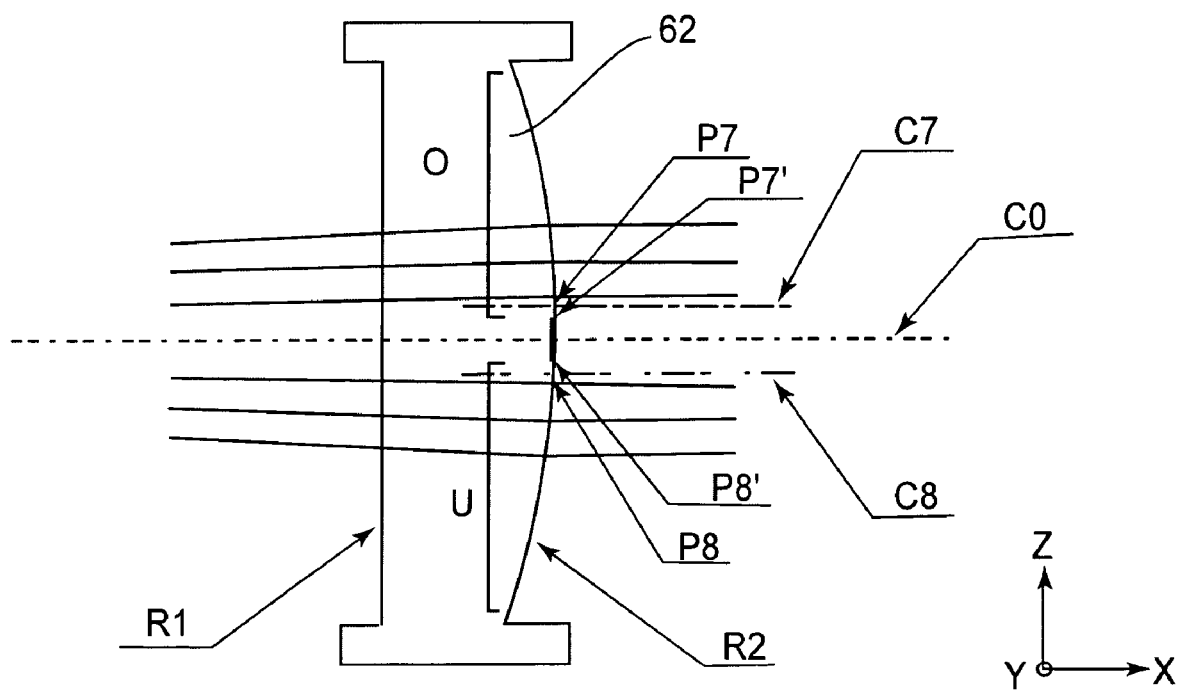
FIG. 17 is a sectional view, along the sub-scan sectional plane, of an imaging lens according to the third embodiment of the present invention.

FIG. 17 is an enlarged view, along the sub-scan sectional plane, of the second imaging lens 26 according to this embodiment of the present invention.

In FIG. 17, the light entrance surface R1 of the second imaging lens 26 comprises a flat surface having no power. On the other hand, the light exit surface R2 thereof has a positive (convex) power with respect to the sub-scan sectional plane, and it is divided into two regions, that is, upper region O and lower region U, with respect to the optical reference axis CO, as viewed in the drawing.

The light exit surface R2 being divided into two regions O and U have a shape as determined in accordance with different functions corresponding to the divided regions, respectively.

Furthermore, the meridional line of each region as defined by that function is shifted so as to reduce distortion of the wavefront aberration to be produced as a result of oblique incidence of two light beams on the deflecting surface 5a of the optical deflector 5.

Here, it should be noted that the reason why the scanning lens closest to the scan surface is divided into two, upper and lower regions, and the optical surface of a shape determined in accordance with different functions corresponding to these regions, respectively, is given to such lens is that two, i.e., upper and lower light beams can be separated from each other very easily without using a large oblique incidence angle.

Denoted at C7 is an axis which extends through the surface vertex P7 of the upper region O of the light exit surface R2 and which is parallel to the optical reference axis CO. Similarly, denoted at C8 is an axis which extends through the surface vertex P8 of the lower region U and which is parallel to the optical reference axis CO.

The imaging magnification βs of the imaging optical system LB according to this embodiment, with respect to the sub-scan sectional plane, is βs=−1.713, and this satisfies Condition (1).

The present embodiment uses such structure that: two, upper and lower light beams with respect to the sub-scan direction are incident on one and the same deflecting surface, and these light beams are imaged upon different scan surfaces. Hence, a light-path bending mirror should be disposed between the scan surface and a final lens closest to the scan surface, to thereby split the light path. To this end, the points where the light beams are imaged upon the scan surfaces should desirably have a spacing of 3 mm or more as measured in the sub-scan direction.

If the points where the light beams are imaged on the scan surfaces are close to each other, even though these light beams are separate from each other on the lens surface, they get close to each other as the scan surface nears. Hence, splitting the light path by using a path bending mirror will be difficult to do.

In this embodiment, the points where the light beams are imaged on the scan surfaces are spaced from each other by a spacing of 4.63 mm as measured in the sub-scan direction. Thus, by a path bending mirror, the light path can be split easily.

The second imaging lens 26 of this embodiment has a thickness 4.9 mm. This is remarkably thin as compared with the imaging lens (thickness 17.9 mm) of Patent Document No. 3 mentioned hereinbefore.

Reducing the thickness of the second imaging lens 26 is very effective that: when it is going to be made of a plastic material, the molding tact is reduced; the inner refractive index distribution is reduced; and birefringence is reduced. In this embodiment, by optimizing the surface shape in the upper region O and the lower region U of the light exit surface R2 of the second imaging lens 26 as described above, the thickness of the second imaging lens 26 can be made small.

Generally, if a light beam is incident on the deflecting surface of an optical deflector obliquely with respect to the sub-scan sectional plane, spot rotation (twist of wavefront aberration) occurs at the abaxial region.

In consideration of it, in this embodiment, the meridional lines of the upper and lower regions O and U of the light exit surface R2 of the second imaging lens 26 are bent and, also, they are shifted in the sub-scan direction (Z direction) toward the side where the light beam passes, by an amount of 0.84195 mm. With this arrangement, in this embodiment, spot rotation from the axial area to the outermost abaxial area is reduced significantly.

Next, the manner how to join the two different regions at a boundary area in the light exit surface R2 of the second imaging lens 26, will be described.

As shown in FIG. 17, the surface vertices P7 and P8 are present around the position where the light beam passes. If therefore the joining method of the first embodiment is used, it causes a possibility that, due to a mounting error of the laser or the like, the light beam goes to any portion other than the lens surface. In consideration of it, in this embodiment, the same joining method as of the second embodiment is used.

More specifically, positions which are at a distance of 0.5 mm upwardly and downwardly from the optical reference axis CO are taken as P7' and P8', respectively. At the positions P7' and P8', the lens surface and the boundary surface are joined together so that the surface shapes of them are equaled each other in the first-order differentiation coefficient.

The manner of calculation for that is the same as of the second embodiment, and description therefor will be omitted here.

Although in this embodiment the imaging optical system comprises two lenses, the present invention is not limited to this. Three or more lenses may be used. Furthermore, the imaging optical system may include a diffractive optical element.

In the first to third embodiments described above, the number of light beams incident on the deflecting surface of the optical deflector is two. However, the present invention is not limited to this. Three or more light beams may be used and incident on one and the same deflecting surface of an optical deflector, in the present invention.

Embodiment of Image Forming Apparatus

Figure 18:
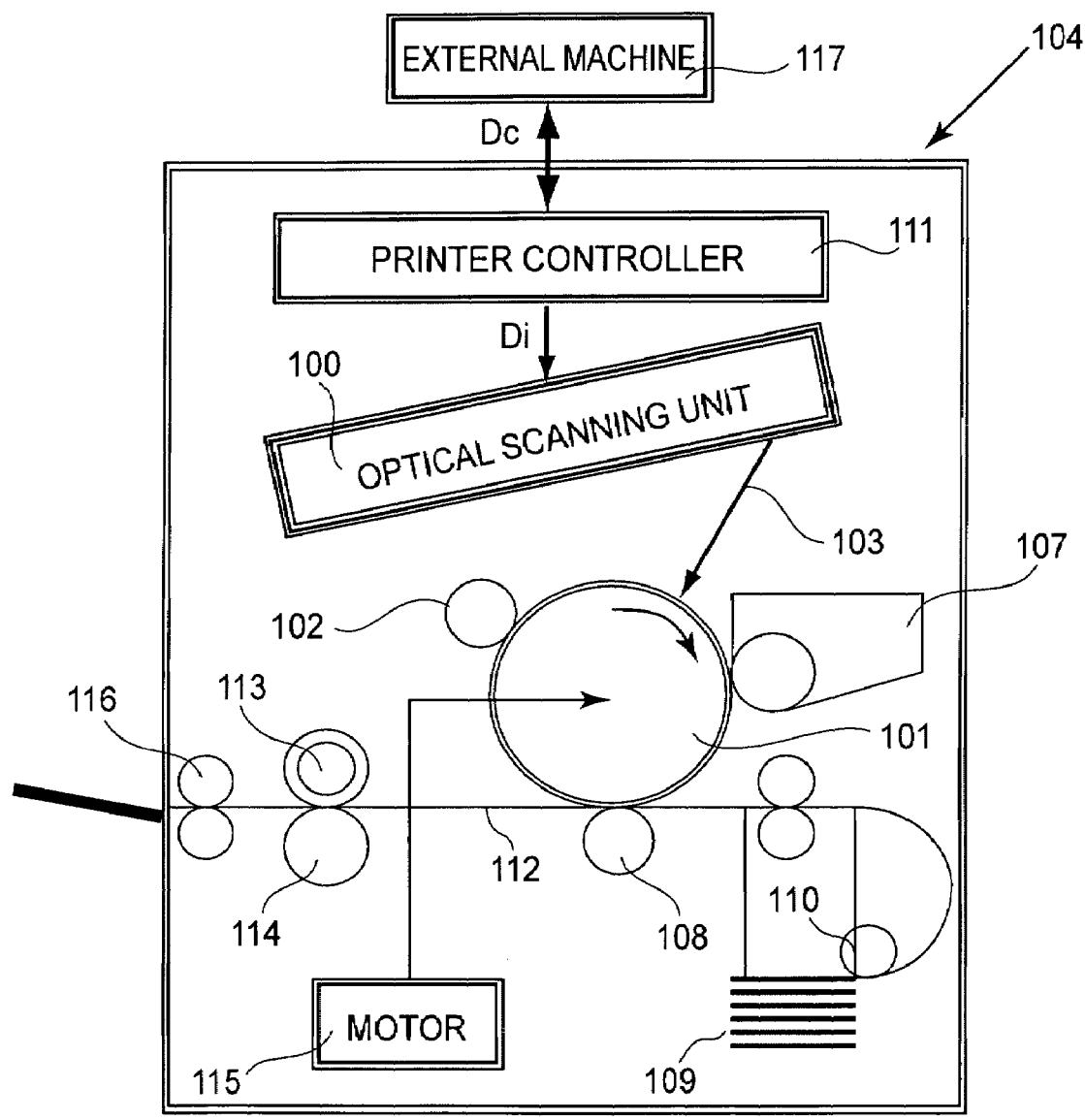
FIG. 18 is a sectional view, along a sub-scan sectional plane, of an image forming apparatus according to an embodiment of the present invention.

FIG. 18 is a schematic and sectional view, in the sub-scan direction, of a main portion of an image forming apparatus according to an embodiment of the present invention. Denoted generally at 104 in the drawing is the image forming apparatus.

The image forming apparatus 104 receives code data Dc supplied thereto from an external machine 117 such as a personal computer, for example. The code data Dc is then transformed by a printer controller 111 inside the apparatus, into imagewise data (dot data) Di.

The imagewise data Di is then inputted into an optical scanning unit 100 which is configured in accordance with any one of the preceding embodiments described hereinbefore. The optical scanning unit 100 produces a light beam 103 having been modulated in accordance with the imagewise data Di, and with this light beam 103, the photosensitive surface of a photosensitive drum 101 is scanned in the main-scan direction.

The photosensitive drum 101 which is an electrostatic latent image bearing member (photosensitive member) is rotated clockwise by means of a motor 115. Through this rotation, the photosensitive surface of the photosensitive drum 101 is moved relatively to the light beam 103, in the sub-scan direction which is orthogonal to the main-scan direction.

Disposed just above the photosensitive drum 101 is a charging roller 102 which is in contact with the photosensitive drum surface to electrically charge the drum surface uniformly. Onto the photosensitive drum 101 surface having been electrically charged by the charging roller 102, the light beam 103 being scanned by the optical scanning unit 100 is projected.

As described above, the light beam 103 has been modulated in accordance with the imagewise data Di. By irradiating the photosensitive drum 101 with this light beam 103, an electrostatic latent image is formed on the photosensitive drum 101 surface. The electrostatic latent image thus formed is then developed into a toner image, by means of a developing device 107 which is provided at a position downstream of the irradiation position of the light beam 103 with respect to the rotational direction of the photosensitive drum 101 and which is in contact with the photosensitive drum 101.

The toner image thus developed by the developing device 107 is transferred onto a transfer sheet (transfer material) 112 below the photosensitive drum 101, by means of a transfer roller 108 which is disposed opposed to the photosensitive drum 101.

Transfer sheets 112 are stored in a sheet cassette 109 in front of (at the right-hand side as viewed in FIG. 18) the photosensitive drum, but these can be supplied manually. There is a sheet supplying roller 110 at an end portion of the sheet cassette 109, for supplying each sheet 112 in the cassette 109 into a sheet supply path.

The paper sheet 112 having an unfixed toner image transferred thereto in the manner described above is conveyed to a fixing device behind (at the left-hand side as viewed in FIG. 18) the photosensitive drum 101. The fixing device comprises a fixing roller 113 having a built-in fixing heater (not shown) and a pressing roller 114 disposed to be press-contacted to the fixing roller 113. The transfer sheet 112 supplied from the image transfer station is heated under pressure at the press contact area between the fixing roller 113 and the pressing roller 114, whereby the unfixed toner image on the transfer sheet 112 is fixed thereon.

Behind the fixing roller 113, there are sheet discharging rollers 116 which function to discharge the image-fixed sheet 112 out of the image forming apparatus.

While not shown in FIG. 18, the print controller 111 has various functions in addition to the data conversion function described hereinbefore, such as for controlling a motor 115 or any other components inside the image forming apparatus as well as a polygon motor inside the optical scanning unit (to be described later).

There is no particular limitation with regard to the recording density of the image forming apparatus to be used in the present invention. However, since the higher the recording density is, the higher the required image quality is, the structures according to the first and second embodiments of the present invention will be more effective when they are introduced into an image forming apparatus of a resolution 1200 dpi or higher.

Embodiment of Color Image Forming Apparatus

Figure 19:
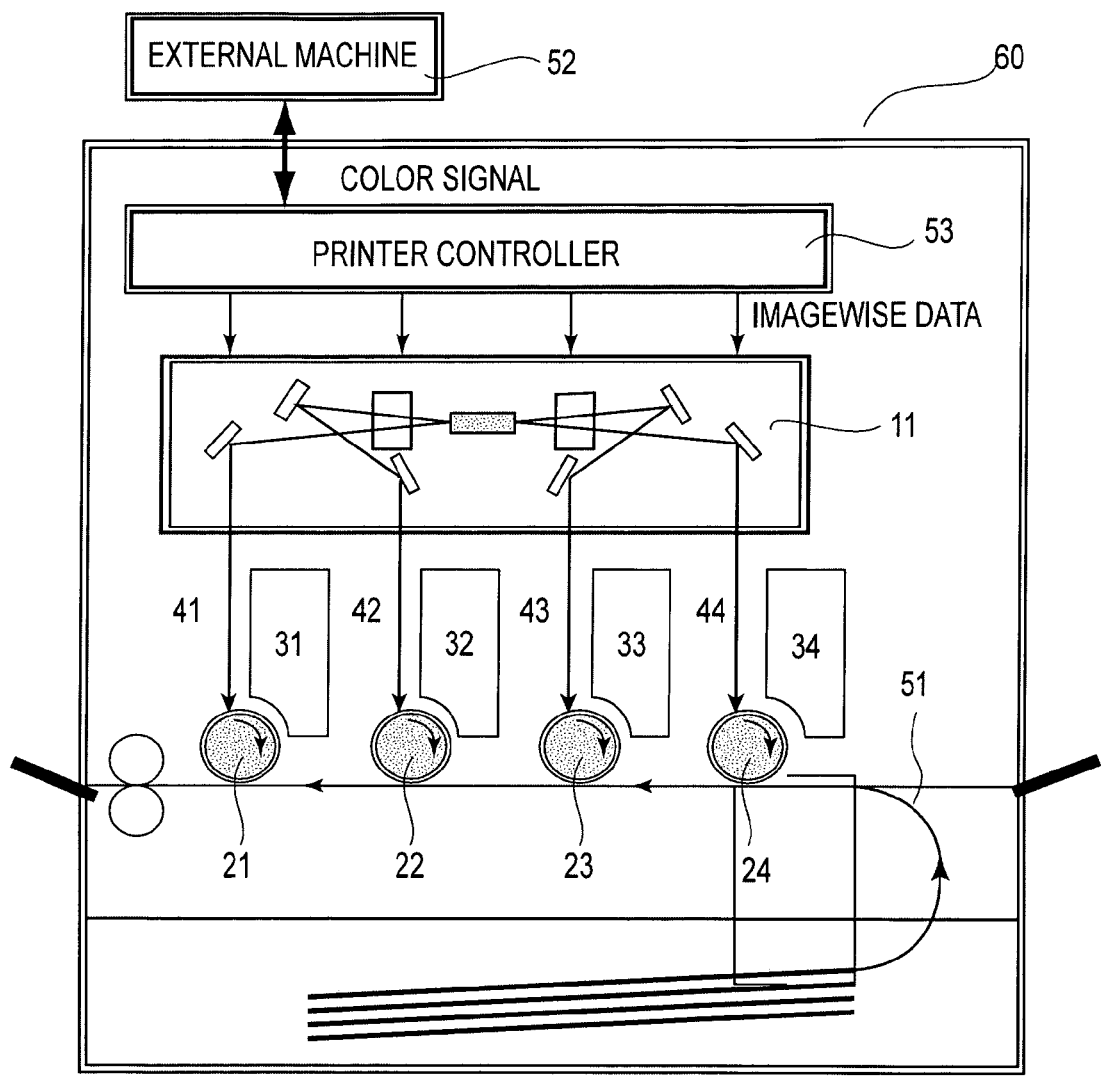
FIG. 19 is a schematic view of a main portion of an image forming apparatus according to an embodiment of the present invention.
Figure 20:
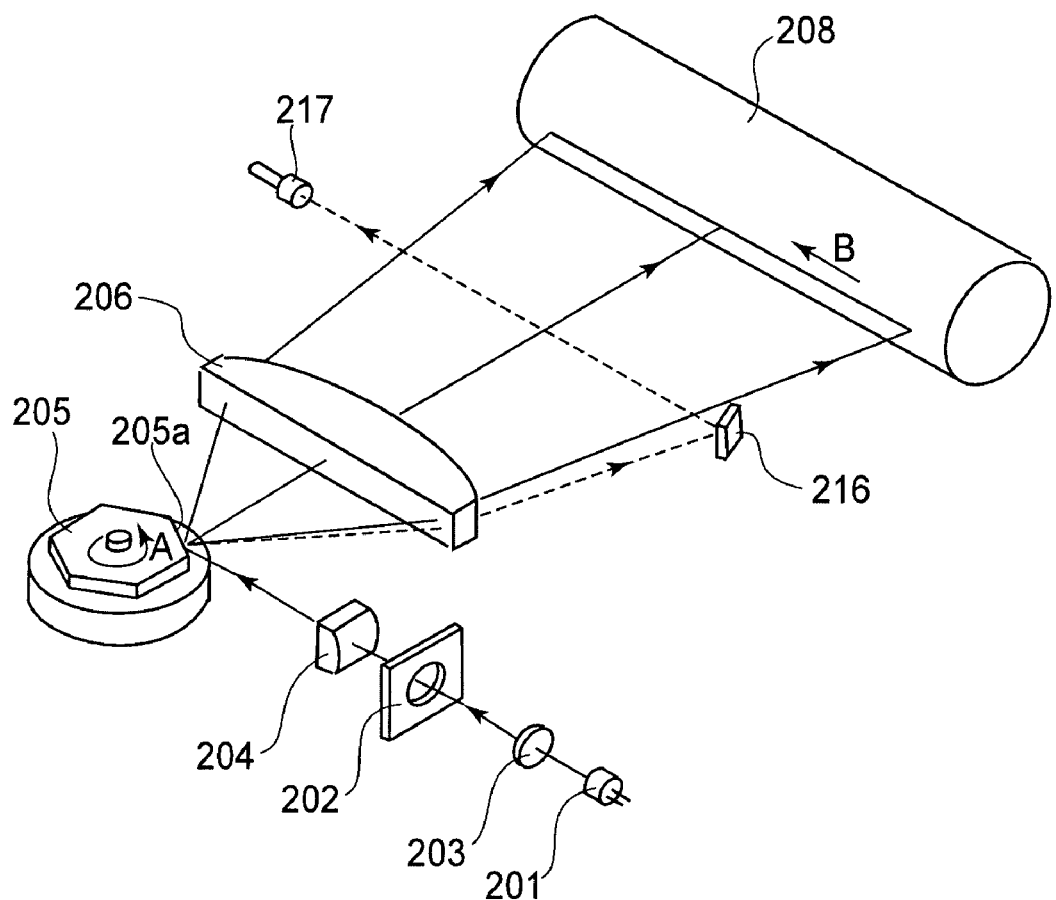
FIG. 20 is a schematic view of a main portion of a conventional optical scanning system.
Figure 21:
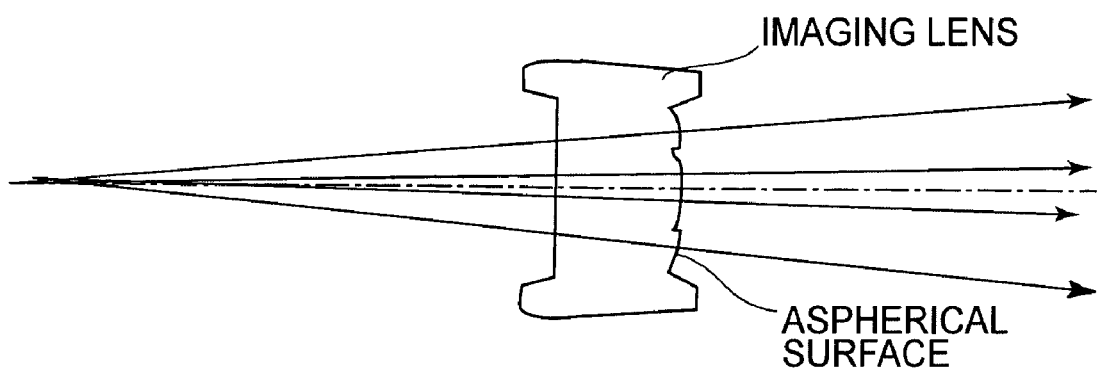
FIG. 21 is a sectional view, along a sub-scan sectional plane, of a conventional imaging lens.
Figure 22:
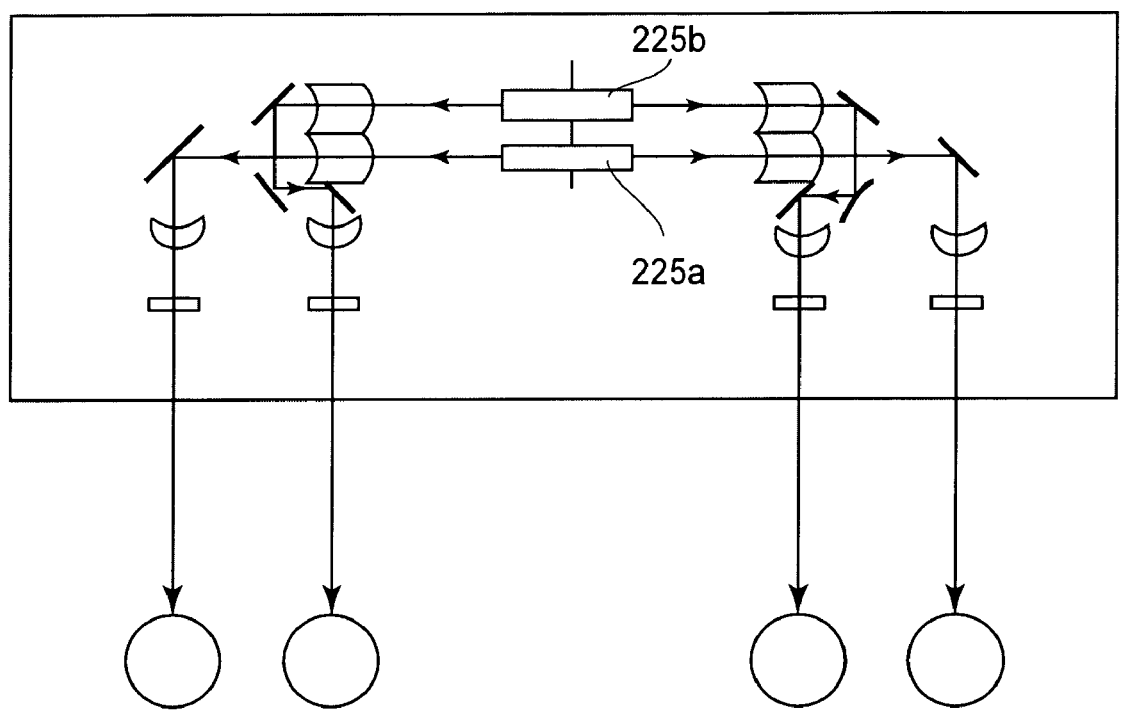
FIG. 22 is a schematic and sectional view of a main portion of a conventional color image forming apparatus.

FIG. 19 is a schematic view of a main portion of a color image forming apparatus according to an embodiment of the present invention. This embodiment is directed to a tandem type color image forming apparatus in which four optical scanning systems are provided so as to record imagewise data upon the surfaces of corresponding photosensitive drums (image bearing members) in parallel to each other.

In FIG. 19, denoted generally at 60 is a color image forming apparatus, and denoted at 11 is an optical scanning system having a structure according to any one of the preceding embodiments (see FIG. 8). Denoted at 21, 22, 23 and 24 are photosensitive drums (image bearing members), and denoted at 31, 32, 33 and 34 are developing devices, respectively. Denoted at 51 is a conveyance belt.

In FIG. 16, the cooler image forming apparatus 60 receives color signals of R (red), G (green) and B (blue) supplied thereto from an outside machine 52 such as a personal computer, for example. These color signals are transformed by means of a printer controller 53 inside the image forming apparatus, into imagewise data (dot data) corresponding to C (cyan), M (magenta), Y (yellow) and K (black).

These imagewise data are inputted into the optical scanning system 11. In response, the optical scanning system produces light beams 41, 42, 43 and 44 having been modulated in accordance with the associated imagewise data. Through these light beams, the photosensitive surfaces of the photosensitive drums 21, 22, 23 and 24 are scanned in the main-scan direction.

In the cooler image forming apparatus of this embodiment, the optical scanning system 11 provides four light beams corresponding to colors of C (cyan), M (magenta), Y (yellow) and K (black), respectively. On the basis of these light beams, imagewise signals (imagewise data) are recorded on the surfaces of the photosensitive drums 21, 22, 23 and 24, respectively, such that a color image is printed at high speed.

As described, in the color image forming apparatus of this embodiment, the optical scanning system 11 is used to produce latent images for different colors upon the surfaces of corresponding photosensitive drums 21, 22, 23 and 24, respectively, through the light beams based on respective image data. After that, these images are superposedly transferred onto a recording sheet, whereby a single full-color image is produced thereon.

As regards the outside machine 52, a color image reading machine having a CCD sensor, for example, may be used. In that occasion, this color image reading machine and the color image forming apparatus 60 will provide a color digital copying machine.

While the invention has been described with reference to the structures disclosed herein, it is not confined to the details set forth and this application is intended to cover such modifications or changes as may come within the purposes of the improvements or the scope of the following claims.

This application claims priority from Japanese Patent Application No. 2005-347153 filed Nov. 30, 2005, for which is hereby incorporated by reference.

What is claimed is:

1. An optical scanning system, comprising:
light source means having a plurality of light emitting portions;
an optical deflector;
an incident optical system for directing a plurality of light beams from said plurality of light emitting portions onto the same deflecting surface of said optical deflector, at different angles with respect to an optical reference axis perpendicular to the deflecting surface and with respect to a sub-scan sectional plane; and
an imaging optical system for imaging the plurality of light beams deflected by said same deflecting surface of said optical deflector upon different scan surfaces, to be scanned, respectively;
wherein said imaging optical system includes an imaging optical element, and the plurality of light beams deflected by said same deflecting surface of said optical deflector are incident on said imaging optical element so that the plurality of light beams pass through different regions of said imaging optical element with respect to the sub-scan sectional plane, respectively,
wherein said imaging optical element has at least one optical surface defined, with respect to the sub-scan sectional plane, in accordance with different functions related to the different regions, respectively,
wherein, when with respect to the sub-scan sectional plane the plurality of light beams incident on the same deflecting surface of said optical deflector have the same reflection point thereon, a meridional line of the optical surface of said imaging optical element defined in accordance with the function with respect to the sub-scan sectional plane, shifts in the sub-scan direction toward the same side, with respect to an optical reference axis which extends through the reflection point and is perpendicular to the deflecting surface, where the light beam passes, and
wherein, when with respect to the sub-scan sectional plane the plurality of light beams incident on the same deflecting surface of said optical deflector have different reflection points on said same deflecting surface, a meridional line of the optical surface of said imaging optical element defined in accordance with the function with respect to the sub-scan sectional plane, shifts in the sub-scan direction toward the same side, with respect to an optical reference axis which extends through a middle point between two reflection points of all the different reflection points which tow points are most separate from each other and is perpendicular to the deflecting surface, where the light beam passes.

2. An optical scanning system according to claim 1, wherein the following condition is satisfied, where βs is an imaging magnification of said imaging optical system with respect to the sub-scan sectional plane:

$$1.0<|\beta s|<3.5.$$

3. An optical scanning system according to claim 1, wherein meridional lines defined by different functions in relation to the different regions, with respect to the sub-scan sectional plane, are curved toward the sub-scan direction.

4. An optical scanning system according to claim 1, wherein said imaging optical system is constituted by a single imaging optical element.

5. An optical scanning system according to claim 1, wherein said imaging optical element having an optical surface with a shape defined in accordance with different functions related to the different regions with respect to the sub-scan sectional plane, has a first optical surface having a shape defined by different functions in relation to the different regions, respectively, with respect to the sub-scan sectional plane, and a second optical surface of flat shape with respect to the sub-scan sectional plane.

6. An optical scanning system according to claim 1, wherein said imaging optical system includes a plurality of imaging optical elements, wherein at least one of said plurality of optical elements has an optical surface of a shape defined by different functions in relation to the different regions, respectively, with respect to the sub-scan sectional plane and is disposed at a position closest to the scan surface.

7. An optical scanning system according to claim 1, wherein optical surfaces of a shape defined by different functions in relation to the different regions, respectively, with respect to the sub-scan sectional plane, are joined each other at a boundary area having a continuous first-order differentiation value.

8. An optical scanning system according to claim 7, wherein in said boundary area the optical surfaces are joined in accordance with a spline function.

9. An optical scanning system according to claim 1, wherein a surface vertex of a sagittal line of optical surfaces defined by different functions in relation to different regions with respect to the sub-scan sectional plane, respectively, are connected along a straight line.

10. An image forming apparatus, comprising:
an optical scanning system as recited in claim 1;
a photosensitive material disposed at a scan surface to be scanned;
a developing device for developing an electrostatic latent image formed on said photosensitive material through a light beam scanned by said optical scanning system, to produce a toner image;
a transferring device for transferring the developed toner image onto a transfer material; and
a fixing device for fixing the transferred toner image, on the transfer material.

11. An image forming apparatus, comprising:
an optical scanning system as recited in claim 1; and
a printer controller for converting code data supplied from an outside machine into an imagewise signal and for inputting the imagewise signal into said optical scanning system.

12. A color image forming apparatus, comprising:
an optical scanning system as recited in claim 1; and
a plurality of image bearing members each being disposed at a scan surface to be scanned by said optical scanning system, for forming images of different colors.

13. A color image forming apparatus according to claim 12, further comprising a printer controller for converting a color signal supplied from an outside machine into imagewise data of different colors and for inputting the imagewise data into corresponding optical scanning systems.

* * * * *

UNITED STATES PATENT AND TRADEMARK OFFICE
CERTIFICATE OF CORRECTION

PATENT NO. : 7,380,720 B2  
APPLICATION NO. : 11/606131  
DATED : June 3, 2008  
INVENTOR(S) : Hidekazu Shimomura Page 1 of 1

It is certified that error appears in the above-identified patent and that said Letters Patent is hereby corrected as shown below:

<u>COLUMN 1</u>
        Line 10, "bean" should read --beam--; and  
        Line 36, "concerns," should read --is concerned,--.

<u>COLUMN 2</u>
        Line 59, "passé" should read --pass--.

<u>COLUMN 4</u>
        Line 19, "joined" should read --joined with--.

<u>COLUMN 7</u>
        Line 62, "passes" should read --pass--.

<u>COLUMN 14</u>
        Line 28, "to two" should read --for both--.

<u>COLUMN 27</u>
        Line 20, "joined" should read --joined with--.

Signed and Sealed this

Twentieth Day of January, 2009

JON W. DUDAS  
*Director of the United States Patent and Trademark Office*